(12) United States Patent
Chou et al.

(10) Patent No.: US 11,963,041 B2
(45) Date of Patent: Apr. 16, 2024

(54) LOAD BALANCING OPTIMIZATION FOR 5G SELF-ORGANIZING NETWORKS

(71) Applicant: Intel Corporation, Santa Clara, CA (US)

(72) Inventors: Joey Chou, Scottsdale, AZ (US); Yizhi Yao, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 248 days.

(21) Appl. No.: 17/092,126

(22) Filed: Nov. 6, 2020

(65) Prior Publication Data
US 2021/0084536 A1  Mar. 18, 2021

Related U.S. Application Data

(60) Provisional application No. 62/933,004, filed on Nov. 8, 2019.

(51) Int. Cl.
*H04W 28/086* (2023.01)
*H04W 36/00* (2009.01)
*H04W 36/08* (2009.01)
*H04W 36/22* (2009.01)
*H04W 84/04* (2009.01)

(52) U.S. Cl.
CPC .......... *H04W 28/0862* (2023.05); *H04W 36/0085* (2018.08); *H04W 36/08* (2013.01); *H04W 36/22* (2013.01); *H04W 84/042* (2013.01)

(58) Field of Classification Search
CPC ......... H04W 28/0812; H04W 36/0085; H04W 36/08; H04W 36/22; H04W 84/042
See application file for complete search history.

(56) References Cited

U.S. PATENT DOCUMENTS

| | | | | |
|---|---|---|---|---|
| 10,516,999 | B1* | 12/2019 | Desai | G06V 20/176 |
| 2009/0163223 | A1* | 6/2009 | Casey | H04W 36/22 |
| | | | | 455/453 |
| 2013/0084910 | A1* | 4/2013 | Suzuki | H04W 24/02 |
| | | | | 455/67.11 |
| 2014/0031006 | A1* | 1/2014 | Moore | H04W 24/02 |
| | | | | 455/405 |
| 2014/0242991 | A1* | 8/2014 | Yanover | H04W 36/22 |
| | | | | 455/436 |
| 2016/0021571 | A1* | 1/2016 | Bansal | H04W 24/02 |
| | | | | 370/236 |
| 2017/0332302 | A1* | 11/2017 | Ercan | H04W 36/0088 |
| 2017/0332303 | A1* | 11/2017 | Sunay | H04W 8/22 |

OTHER PUBLICATIONS

3rd Generation Partnership Project; Technical Specification Group Services and System Aspects; Management and orchestration; Self-Organizing Networks (SON) for 5G networks, Nov. 2019, 3GPP TS 28.313 v0.2.0, p. 31-36 (Year: 2019).*

* cited by examiner

*Primary Examiner* — Christopher M Crutchfield
*Assistant Examiner* — Tito Q Pham
(74) *Attorney, Agent, or Firm* — Schwabe, Williamson & Wyatt, P.C.

(57) ABSTRACT

Various embodiments generally may relate to Load Balancing Optimization (LBO) and Mobility Robustness Optimization (MRO). Some embodiments of this disclosure are directed to the following 5G SON solutions: use cases and requirements for the management of distributed LBO and centralized LBO; procedures for the management of distributed LBO and centralized LBO; and management services and information needed to support the management of distributed LBO and centralized LBO.

13 Claims, 11 Drawing Sheets

400 retrieving load-related measurements for a plurality of new radio (NR) cells from a memory
405 determining, based on the load-related measurements, that load distribution optimization is necessary
410 executing, based on determining that load distribution optimization is necessary, a load balancing optimization (LBO) function, wherein executing the LBO function includes changing one or more LBO parameters to optimize traffic load distributions among neighboring NR cells
415

Figure 4A

420 

collecting load-related measurements for a plurality of new radio (NR) cells
425 determining, based on the load-related measurements, that load distribution optimization is necessary
430 executing, based on determining that load distribution optimization is necessary, a load balancing optimization (LBO) function, wherein executing the LBO function includes changing one or more LBO parameters to optimize traffic load distributions among neighboring NR cells
435

Figure 4B

440 

```
receiving a request to enable a load balancing optimization (LBO) function from a
management services (MnS) consumer of a centralized self-organizing network (C-
SON)
445
```

↓

```
in response to receiving the request, enabling the LBO function
450
```

↓

```
collecting load-related measurements for a plurality of new radio (NR) cells
455
```

↓

```
determining, based on the load-related measurements, that load distribution
optimization is necessary
460
```

↓

```
executing, based on determining that load distribution optimization is necessary, the
LBO function, wherein executing the LBO function includes changing one or more
LBO parameters to optimize traffic load distributions among neighboring NR cells
465
```

Figure 4C

LOAD BALANCING OPTIMIZATION FOR 5G SELF-ORGANIZING NETWORKS

CROSS REFERENCE TO RELATED APPLICATION

The present application claims priority to U.S. Provisional Patent Application No. 62/933,004 filed Nov. 8, 2019, the disclosure of which is hereby incorporated by reference in its entirety.

FIELD

Embodiments relate generally to the technical field of wireless communications, and in particular, to self-organizing network (SON) functions for fifth generation (5G) networks.

BACKGROUND

3rd Generation Partnership Project (3GPP) System Aspects Management and orchestration of networks includes self-organizing networks (SON). SON refers to a set of technologies and mechanisms designed to enable automatic configuration, optimization, and management of cellular networks. A goal of SON is to enhance the performance, efficiency, and reliability of mobile networks while minimizing the need for manual (e.g., human) intervention by network operators.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIGS. 4A, 4B, and 4C illustrate examples of operation flow/algorithmic structures in accordance with some embodiments.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Figure 1:
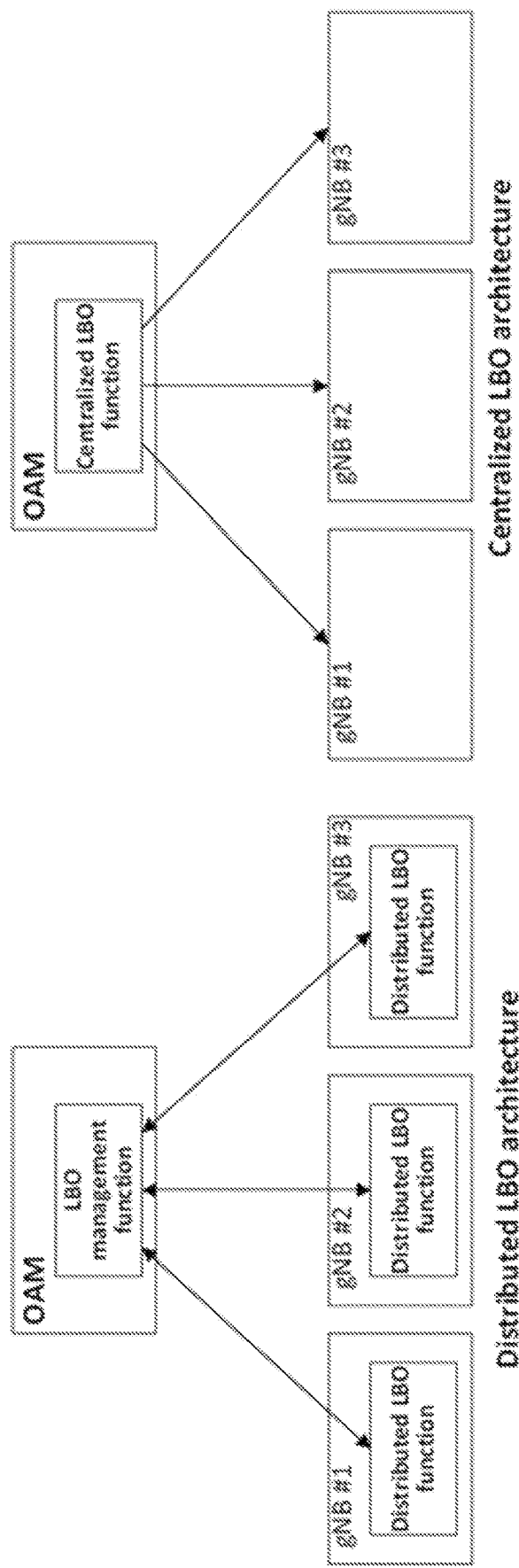
FIG. 1 illustrates an example of a distributed load balancing optimization (LBO) architecture and a centralized LBO architecture in accordance with various embodiments.

Examples of SON functions include Load Balancing Optimization (LBO) and Mobility Robustness Optimization (MRO), among many others. In some embodiments, one objective of LBO is to automatically distribute user traffic among neighboring cells to insure the radio resources are efficiently used, while providing quality end-user experience and performance. LBO may collect and analyze the load information to determine the actions that may include UE selection where the gNB selects and commands some UE(s) to handover to non-congested neighboring cells, cell reselection where the gNB directs some UE(s) to camp on less congested neighboring cells, and mobility setting where the gNB modifies the handover parameters to change the coverage of a congested cell. FIG. 1 illustrates ways to implement LBO where the distributed LBO function may reside in gNB, and is managed by the LBO management function in the operations administration and maintenance (OAM), while the centralized LBO function may reside in the OAM.

Among other things, embodiments of the present disclosure are directed to LBO and MRO. In some embodiments, this disclosure is directed to the following 5G SON solutions: use cases and requirements for the management of distributed LBO and centralized LBO; procedures for the management of distributed LBO and centralized LBO; and management services and information needed to support the management of distributed LBO and centralized LBO.

1. Example Requirements 1.1. Distributed SON Management 1.1.1. Load balancing optimization REQ-DLBO-FUN-1 Management Services (MnS) producer of D-SON management should have a capability allowing an authorized consumer to set or update the LBO policy, including traffic load threshold and target, for NR cell(s).

REQ-DLBO-FUN-2 MnS producer of D-SON management should have a capability allowing an authorized consumer to enable or disable the D-LBO function.

REQ-DLBO-FUN-3 MnS producer of D-SON management should have a capability allowing an authorized consumer to receive the performance measurements for LBO performance evaluation.

REQ-DLBO-FUN-4 MnS producer of D-SON management should have a capability to notify the authorized consumer with the load balancing action being performed for NR cell(s).

REQ-DLBO-FUN-5 MnS producer of D-SON management should have a capability to change the LBO parameters, such as the handover, cell reselection parameters.

1.2. Centralized SON
1.2.1. Load Balancing Optimization

REQ-CLBO-FUN-1 MnS producer of C-SON should have a capability allowing an authorized consumer to enable or disable the C-LBO function.

REQ-CLBO-FUN-2 MnS producer of C-SON should have a capability to collect and analyze the load performance measurements or notifications from NR cells.

REQ-CLBO-FUN-3 MnS producer of C-SON should have a capability to change the LBO parameters, such as the handover, cell reselection parameters to optimize the traffic load distributions among neighboring cells.

REQ-CLBO-FUN-4 MnS producer of C-SON should have a capability to notify the authorized consumer about the LBO parameter change or update.

REQ-CLBO-FUN-5 MnS producer of C-SON should have a capability to collect and analyze the performance measurements, and may update LBO parameters if the performance does not meet the target.

2. Example Use Cases
2.1. Distributed SON Management
2.1.1. The Management of Load Balancing Optimization

| Use case stage | Evolution/Specification | <<Uses>> Related use |
|---|---|---|
| Goal | To manage the distributed load balancing optimization function. | |
| Actors and Roles | An authorized consumer of the MnS producer of D-SON management. | |
| Telecom resources | gNB; The MnS producer of D-SON management | |
| Assumptions | N/A | |
| Pre-conditions | 5G NR cells are in operation. | |
| Begins when | The MnS producer of D-SON management has been deployed and in operation. | |
| Step 1 (M) | The MnS producer of D-SON management receives a request from a consumer to configure the LBO policy (e.g. traffic load threshold and target) for NR cell(s), and then configures the policy at the D-LBO function. | |
| Step 2 (M) | The MnS producer of D-SON management receives a request from a consumer to enable the D-LBO function, and then activates the D-LBO function at NR cell(s). | |
| Step 3 (M) | The D-LBO function analyses the load information to determine if it is necessary to perform load balancing among NR cells. If so, it will perform the step 4. | |
| Step 4.1 (O) | The D-LBO function changes the cell reselection/handover parameters and handover actions (e.g. offloading UEs to neighboring cells) and notifies the MnS of D-SON management about the load balancing action being performed. | |
| Step 4.2 (O) | The MnS producer of D-SON management notifies the consumer with the load balancing action being performed. | |
| Step 4.3 (O) | The MnS producer of D-SON management collects the performance measurements to evaluate the D-LBO performance. | |
| Step 4.4 (O) | The D-LBO management function analyzes the measurements, and may perform one or more of the following actions, if the D-LBO performance does not meet the target: 1. update the LBO parameters, such as the handover, cell reselection parameters 2. notify the consumer with the LBO parameter changes. | |
| Step 4.5 (O) | The MnS producer of D-SON management may report the performance measurements for LBO performance evaluation to the consumer, if subscribed. | |
| Step 4.6 (O) | The MnS producer of D-SON management receives a request from the consumer to update the LBO policy. | |
| Ends when | All the steps identified above are successfully completed. | |
| Exceptions | One of the steps identified above fails. | |
| Post-conditions | The traffic load has been balanced among neighbouring cells. | |
| Traceability | REQ-DLBO-FUN-1, REQ-DLBO-FUN-2, REQ-DLBO-FUN-3, REQ-DLBO-FUN-4, REQ-DLBO-FUN-5 | |

2.2. Centralized SON Management
2.2.1. Load Balancing Optimization

| Use case stage | Evolution/Specification | <<Uses>> Related use |
|---|---|---|
| Goal | To automatically optimize the traffic load distributions among neighboring NR cells. | |
| Actors and Roles | An authorized consumer of the MnS producer of C-SON. | |
| Telecom resources | gNB; The MnS producer of C-SON | |
| Assumptions | N/A | |
| Pre-conditions | The C-LBO function is in operation. | |

| Use case stage | Evolution/Specification | <<Uses>> Related use |
|---|---|---|
| Begins when | The MnS producer of C-SON receives a request from a consumer to enable the C-LBO function for NR cell(s). | |
| Step 1 (M) | The MnS producer of C-SON collects the load performance measurements or notifications (e.g. threshold crossing of certain measurements) from NR cells. | |
| Step 2 (M) | The MnS producer of C-SON analyses the measurements to determine if it is necessary to perform load balancing among NR cells. If so, it will perform the step 3. | |
| Step 3.1 (O) | The MnS producer of C-SON changes the LBO parameters, such as the handover, cell reselection parameters (TS 38.300 [x]) to optimize the traffic load distributions among neighbouring cells. | |
| Step 3.2 (O) | The MnS producer of C-SON notifies the consumer about the change of LBO parameters. | |
| Step 3.3 (O) | The MnS producer of C-SON collects the performance measurements (e.g. the number of RRC connection establishment/ release, abnormal release, handover failures, call drops, etc . . .). | |
| Step 3.4 (0) | The MnS producer of C-SON analyses the performance measurements to evaluate the LBO performance, and may performe the following actions if the performance does not meet the target. 1. update the handover, cell reselection parameters, 2. notify the consumer with the LBO parameter changes. | |
| Ends when | All the steps identified above are successfully completed. | |
| Exceptions | One of the steps identified above fails. | |
| Post-conditions | The traffic load has been balanced among neighbouring cells. | |
| Traceability | REQ-CLBO-FUN-1, REQ-CLBO-FUN-2, REQ-CLBO-FUN-3, REQ-CLBO-FUN-4, REQ-CLBO-FUN-5 | |

Figure 2:
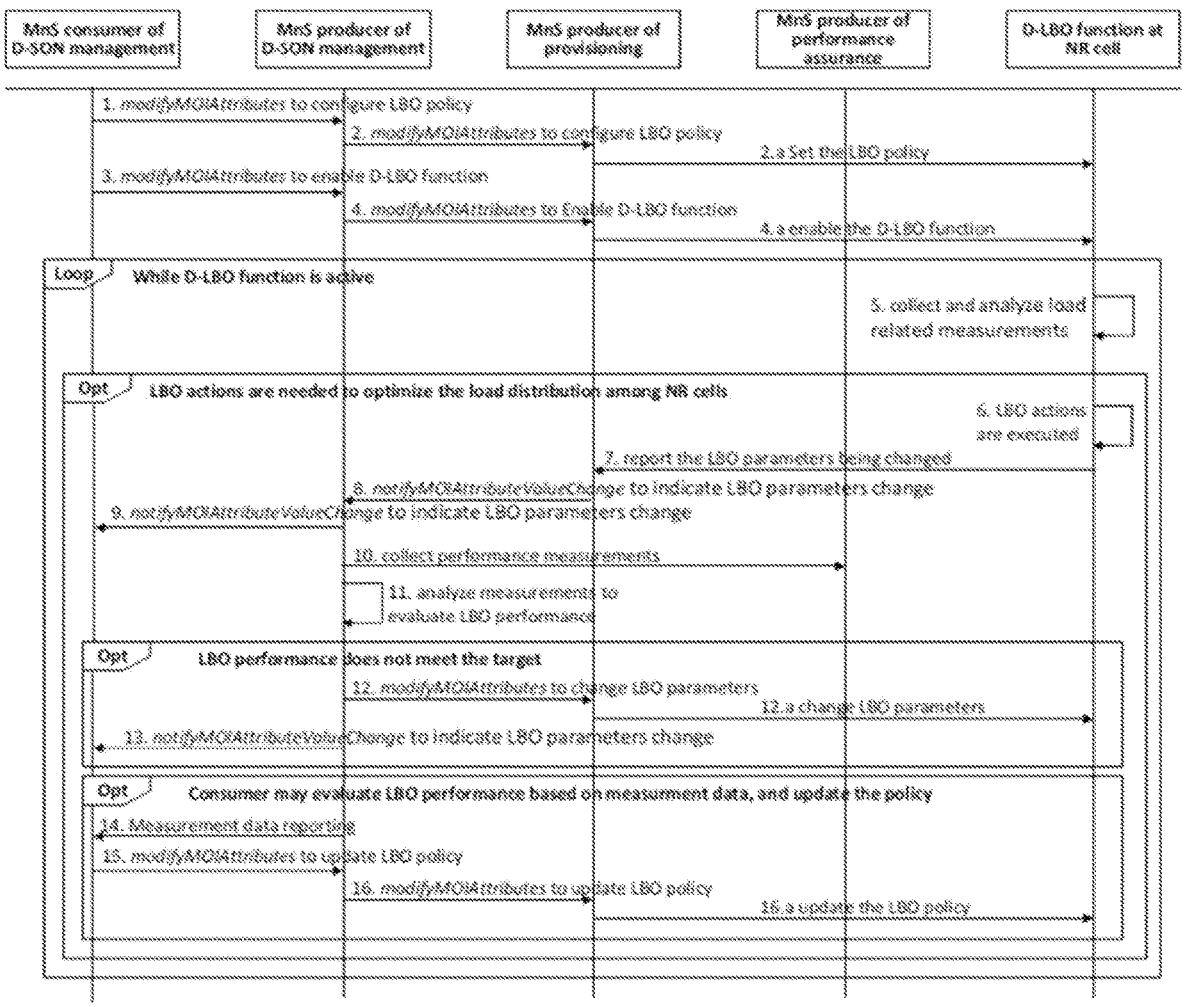
FIG. 2 illustrates an example of management of an LBO procedure in accordance with various embodiments.

3. Example Son Procedures 3.1. Distributed SON Management 3.1.1. The Management of D-LBO Function FIG. 2 depicts a procedure that describes how MnS producer of D-SON management can manage the D-LBO function.

1. The MnS consumer of D-SON management consumes the MnS of D-SON management with modifyMOIAttributes operation to configure the LBO policy for NR cell(s) that may include thresholds and targets.
2. The MnS producer of D-SON management consumes the MnS of NF provisioning with modifyMOIAttributes operation to configure the LBO policy for NR cell(s).
2.a The MnS of provisioning sets the LBO policy at the D-LBO function (NOTE)
3. The MnS consumer of D-SON management consumes the MnS of D-SON management with modifyMOIAttributes operation to enable the D-LBO function for NR cell(s).
4. The MnS producer of D-SON management consumes the MnS of NF provisioning with modifyMOIAttributes operation to enable the D-LBO function for NR cell(s).
4.a The MnS of provisioning enables the D-LBO function (NOTE).
5. The D-LBO function collects and analyzes the load related measurements.
6. The D-LBO function determines it is necessary to optimize the load distribution by executing the LBO actions.
7. The D-LBO function reports the LBO parameters changes to MnS of NF provisioning.
8. The MnS of NF provisioning sends a notification notifyMOIAttributeValueChange to MnS producer of D-SON management to indicate the LBO parameters have been changed.
9. The MnS producer of D-SON management sends a notification notifyMOIAttributeValueChange to MnS consumer of D-SON management to indicate the LBO parameters have been changed.
10. The MnS producer of D-SON management collects performance measurements (e.g., the number of RRC connection establishment/release, abnormal release, handover failures, call drops, etc.) from MnS of performance assurance.
11. The MnS producer of D-SON management analyzes the measurements to evaluate the LBO performance.
12. The MnS producer of D-SON management consumes the MnS of NF provisioning with modifyMOIAttributes operation to update the LBO parameters (e.g., the handover parameters, handover parameter ranges, cell reselection parameters) of the NR cell or its neighbors if the LBO performance does not meet the target
12.a The MnS of provisioning update the LBO parameters at the D-LBO function (NOTE).
13. The MnS producer of D-SON management sends a notification notifyMOIAttributeValueChange to MnS consumer of D-SON management to indicate the LBO parameters have been updated.
14. The MnS producer of D-SON management may report the measurement data via notifyFileReady or reportStreamData operation (e.g., clauses 6.2.3, 7.4 in 3GPP TS 28.550) to the consumer.
15. The MnS consumer of D-SON management may consumes the MnS of D-SON management with modifyMOIAttributes operation to update the LBO policy if the LBO performance does not meet the target.
16. The MnS producer of D-SON management consumes the MnS of NF provisioning with modifyMOIAttributes operation to update the LBO policy.
16.a The MnS of provisioning update the LBO policy (NOTE).

NOTE: The interface between MnS of provisioning and D-LBO function is not subject to standardization.

3.2. Centralized SON

Figure 3:
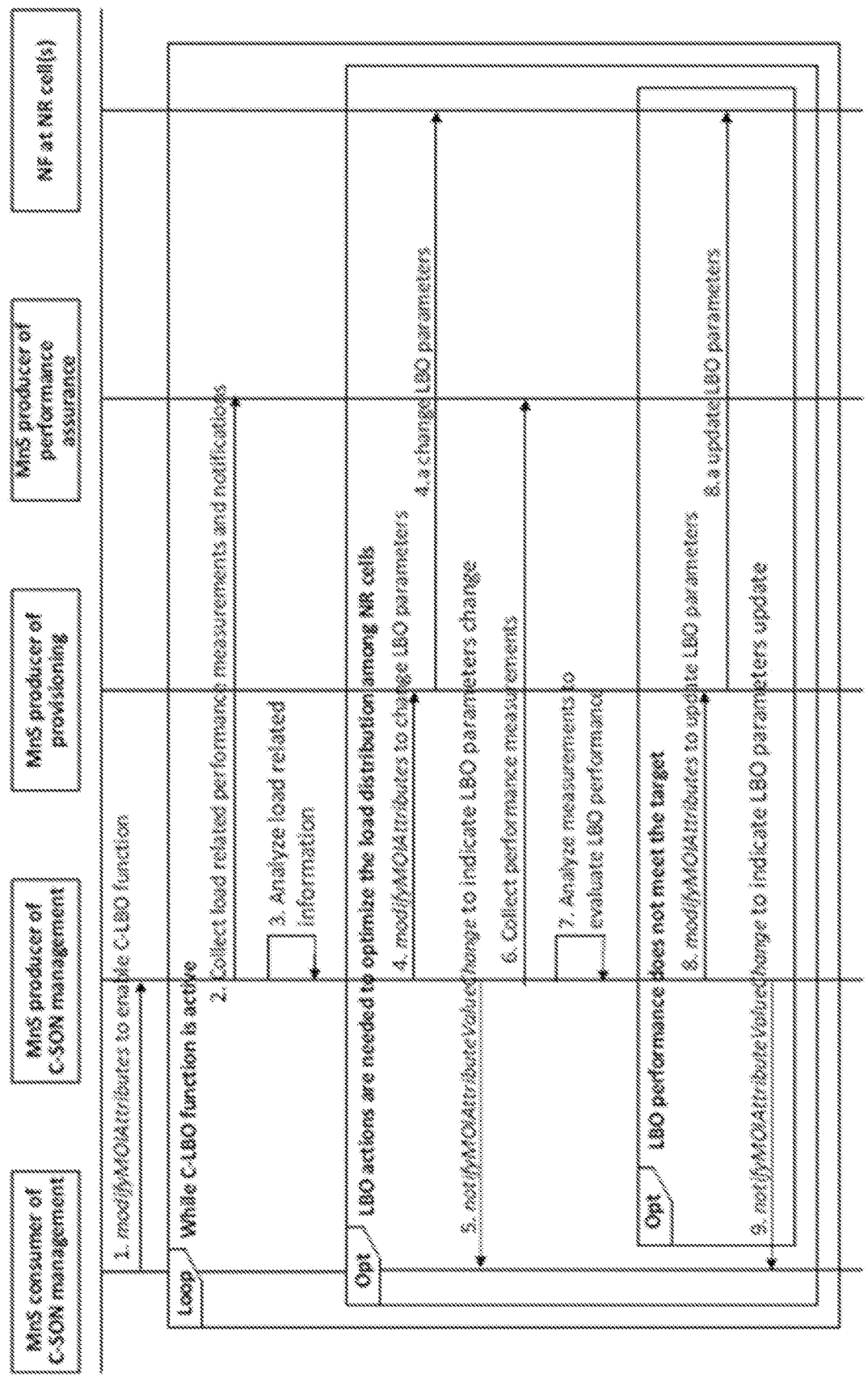
FIG. 3 illustrates an example of a centralized LBO procedure, in accordance with various embodiments.

FIG. 3 depicts a procedure that describes how MnS producer of C-SONmanagement can optimize the load distribution among NR cell(s).

1. The MnS consumer of C-SON consumes the MnS of C-SON management with modifyMOIAttributes operation to enable the C-LBO function.
2. The MnS producer of C-SON collects performance measurements (e.g., radio resource usage, HW/VR/TNL load indicators, Composite Available Capacity PRB, TNL measurements, and so forth) or notifications (e.g., threshold crossing of certain measurements) from NR cells from MnS of performance assurance.
3. The MnS producer of C-SON analyzes the load related information.
4. The MnS producer of C-SON determines that it is necessary to optimize the load distribution among NR cells, by consuming the MnS of NF provisioning with modifyMOIAttributes operation to update the LBO parameters (e.g., the handover and/or cell reselection parameters).
4.a The MnS of provisioning update the LBO parameters at the NR cell (NOTE).
5. The MnS producer of C-SON sends a notification notifyMOIAttributeValueChange to MnS consumer of C-SON to indicate the LBO parameters have been changed.
6. The MnS producer of C-SON collects LBO performance related measurements (e.g., the number of RRC connection establishment/release, abnormal release, handover failures, call drops, etc. . . . ) from MnS of performance assurance.
7. The MnS producer of C-SON analyzes the measurements to evaluate the LBO performance.
8. The MnS producer of C-SON consumes the MnS of NF provisioning with modifyMOIAttributes operation to update the LBO parameters (e.g., the handover and/or cell reselection parameters) of the NR cell or its neighbors if the LBO performance does not meet the target.
8a The MnS of provisioning update the LBO parameters at the NR cell (NOTE).
9. The MnS producer of C-SON sends a notification notifyMOIAttributeValueChange to MnS consumer of C-SON to indicate the LBO parameters have been updated.

NOTE: The interface between MnS of provisioning and network function at NR cell(s) is not subject to standardization.

4. Management Services for Son

4.1. Management Services for D-SON Management
4.1.1. Management of Distributed LBO
4.1.1.1. Management Services

| MnS Name | MnS Component Type A (operations and notifications) | MnS Component Type B (information model) | Note |
| --- | --- | --- | --- |
| D-SON management | Operations defined in clause 5 of 3GPP TS 28.532: getMOIAttributes operation modifyMOIAttributes operation notifyMOIAttributeValueChange operation | | |

4.1.1.2. Information Definition
4.1.1.2.1. Policy Information

The policy of D-LBO function may include targets and thresholds, as shown in Table 7.1.x.2.1-1 and Table 7.1.x.2.1-2.

TABLE 7.1.x.2.1-1

| LBO targets | | |
| --- | --- | --- |
| Target parameters | Definition | Legal Values |
| Attempted RRC connection establishments successfill rate | Successful RRC connection establishments/ Attempted RRC connection establishments | [0 . . . 100] in unit percentage |
| RRC connection re-establishment successful rate with UE context | RRC connection re-establishment with UE context/Number of RRC connection re-establishment attempts | [0 . . . 100] in unit percentage |
| RRC connection re-establishment successful rate without UE context | RRC connection re-establishment without UE context/Number of RRC connection re-establishment attempts | [0 . . . 100] in unit percentage |
| RRC connection resuming successful rate | Successful RRC connection resuming/Number of RRC connection resuming attempts | [0 . . . 100] in unit percentage |
| Requested handover preparations failure rate | Number of failed handover preparations/Number of requested handover preparations | [0 . . . 100] in unit percentage |
| Requested handover resource allocations failure rate | Number of failed handover resource allocations/ Number of requested handover resource allocations | [0 . . . 100] in unit percentage |
| Requested handover executions faiure rate | Number of failed handover executions/Number of requested handover executions | [0 . . . 100] in unit percentage |
| Requested PDU Sessions setup successful rate | Number of PDU Sessions failed to setup/ Number of PDU Sessions requested to setup | [0 . . . 100] in unit percentage |

TABLE 7.1.x.2.1-2

LBO thresholds

| Threshold parameters | Definition | Legal Values |
|---|---|---|
| DL Total PRB Usage | This attribute describes the threshold to trigger LBO function. | [0 . . . 100] in unit percentage |
| Total PRB Usage | This attribute describes the threshold to trigger LBO function. | [0 . . . 100] in unit percentage |
| Mean virtual CPU usage | This attribute describes the threshold to trigger LBO function. | [0 . . . 100] in unit percentage |
| Mean virtual memory usage | This attribute describes the threshold to trigger LBO function. | [0 . . . 100] in unit percentage |
| Mean virtual disk usage | This attribute describes the threshold to trigger LBO function. | [0 . . . 100] in unit percentage |

4.1.1.2.2. Control Information

The parameter is used to control the D-LBO function.

| Control parameter | Definition | Legal Values |
|---|---|---|
| D-LBO control | This attribute allows authorized consumer to enable/disable the D-LBO functionality. | Boolean On, off |

4.1.1.2.3. Performance Measurements

Performance measurements related D-LBO are captured in Table 7.1.x.2.3.-1,

TABLE 7.1.x.2.3-1

D-LBO related performance measurements

| Performance measurements | Description | Related targets |
|---|---|---|
| Attempted RRC connection establishments | Refer to clause 5.1.1.15.1 in TS 28.552 [y]. | Attempted RRC connection establishments successful rate |
| Successful RRC connection establishments | Refer to clause 5.1.1.15.2 in TS 28.552 [y]. | Attempted RRC connection establishments successful rate |
| Number of RRC connection re-establishment attempts | Refer to clause 5.1.1.17.1 in TS 28.552 [y]. | RRC connection re-establishment successful rate with UE context |
| Successful RRC connection re-establishment with UE context | Refer to clause 5.1.1.17.2 in TS 28.552 [y]. | RRC connection re-establishment successful rate with UE context |
| Successful RRC connection re-establishment without UE context | Refer to clause 5.1.1.17.3 in TS 28.552 [y]. | RRC connection re-establishment successful rate without UE context |
| Number of RRC connection resuming attempts | Refer to clause 5.1.1.18.1 in TS 28.552 [y]. | RRC connection resuming successful rate |
| Successful RRC connection resuming | Refer to clause 5.1.1.18.2 in TS 28.552 [y]. | RRC connection resuming successful rate |
| Number of requested handover preparations | Refer to clause 5.1.1.6.1.1 in TS 28.552 [y]. | Requested handover preparations failure rate |
| Number of failed handover preparations | Refer to clause 5.1.1.6.1.3 in TS 28.552 [y]. | Requested handover preparations failure rate |
| Number of requested handover resource allocations | Refer to clause 5.1.1.6.1.4 in TS 28.552 [y]. | Requested handover resource allocations failure rate |
| Number of failed handover resource allocations | Refer to clause 5.1.1.6.1.6 in TS 28.552 [y]. | Requested handover resource allocations failure rate |

TABLE 7.1.x.2.3-1-continued

D-LBO related performance measurements

| Performance measurements | Description | Related targets |
|---|---|---|
| Number of requested handover executions | Refer to clause 5.1.1.6.1.7 in TS 28.552 [y]. | Requested handover executions faiure rate |
| Number of failed handover executions | Refer to clause 5.1.1.6.1.9 in TS 28.552 [y]. | Requested handover executions faiure rate |
| Number of PDU Sessions requested to setup | Refer to clause 5.1.1.5.1 in TS 28.552 [y]. | Requested PDU Sessions setup successful rate |
| Number of PDU Sessions failed to setup | Refer to clause 5.1.1.5.3 in TS 28.552 [y]. | Requested PDU Sessions setup successful rate |

4.2. Management Services for C-SON

4.2.1. Centralized LBO

4.2.1.1. Management Services

| MnS Name | MnS Component Type A (operations and notifications) | MnS Component Type B (information model) | Note |
|---|---|---|---|
| D-SON management | Operations defined in clause 5 of TS 28.532 [8]: getMOIAttributes operation modifyMOIAttributes operation notifyMOIAttributeValueChange operation Operations defined in clause 11.3.1.1.1 in TS 28.532 [x] and clause 6.2.3 of TS 28.550 [8]: notifyFileReady operation reportStreamData operation | | . |

4.2.1.2. Information Definition

4.2.1.2.1. Control Information

The parameter is used to control the C-LBO function.

| Control parameter | Definition | Legal Values |
|---|---|---|
| C-LBO control | This attribute allows authorized consumer to enable/disable the C-LBO functionality. | Boolean On. off |

4.2.1.2.2. Parameters to be Updated

Tables 7.2.x.2.2-1 and 7.2.x.2.2-2 summarize the handover parameters as defined in 3GPP TS 38.331.

TABLE 7.2.x.2.2-1

Handover parameters for intra-RAT handovers

| Event | Summary | Tunable parameters |
|---|---|---|
| A1 | Serving becomes better than threshold | Ms, Hys, Thresh, Ms, Hys |
| A2 | Serving becomes worse than threshold | Ms, Hys, Thresh, Ms, Hys |
| A3 | Neighbour becomes offset better than SpCell | Mn, Mp, Ofn, Ocn, Ofp, Ocp, Hys, Off |
| A4 | Neighbour becomes better than threshold | Mn, Ofn, Ocn, Hys, Thresh |

TABLE 7.2.x.2.2-1-continued

Handover parameters for intra-RAT handovers

| Event | Summary | Tunable parameters |
|---|---|---|
| A5 | SpCell becomes worse than threshold1 and neighbour/SCell becomes better than threshold2 | Mn, Mp, Ofn, Ocn, Hys, Thresh1, Thresh2 |
| A6 | Neighbour becomes offset better than SCell | Mn, Ms, Ocn, Ocs, Hys, Off |

TABLE 7.2.x.2.2-2

Handover parameters for inter RAT handover

| Event | Summary | Tunable parameters |
|---|---|---|
| B1 | Inter RAT neighbour becomes better than threshold | Mn, Ofn, Ocn, Hys, Thresh |
| B2 | PCell becomes worse than threshold1 and inter RAT neighbour becomes better than threshold2 | Mp, Mn, Ofn, Ocn, Hys, Thresh1, Thresh2 |

The parameters to be updated by the MRO are shown in Table 7.2.x.2.2-3.

TABLE 7.2.x.2.2-3

Handover parameters

| Control parameters | Definition | Legal Values |
|---|---|---|
| A1 threshold RSRP | RSRP Threshold as defined in reportConfigNR in TS 38.331 [c] that is used as handover triggering condition for event A1. Allowed value 0 . . . 127, mapping to the range of −156 dBm to −31 dBm with 1 dB resolution (see clause 10.1.6 in TS 38.133 [d]) | 0,,127 |
| A1 threshold RSRQ | RSRQ Threshold as defined in reportConfigNR in TS 38.331 [c] that is used as handover triggering condition for event A1. Allowed value 0 . . . 127, mapping to te range of −43 dB to 20 dB with 0.5 dB resolution (see clause 10.1.11 in TS 38.133 [d]) | 0,,127 |
| A1 hysteresis | The hysteresis parameter as defined in reportConfigNR in TS 38.331 [c] for A1 event. The allowed value 0 . . . 30 times 0.5 dB to get the actual value. | 0 . . . 30 |
| A2 threshold RSRP | RSRP Threshold as defined in reportConfigNR in TS 38.331 [c] that is used as handover triggering condition for event A2. Allowed value 0 . . . 127, mapping to the range of −156 dBm to −31 dBm with 1 dB resolution (see clause 10.1.6 in TS 38.133 [d]) | 0,,127 |
| A2 threshold RSRQ | RSRQ Threshold as defined in reportConfigNR in TS 38.331 [c] that is used as handover triggering condition for event A2. Allowed value 0 . . . 127, mapping to te range of −43 dB to 20 dB with 0.5 dB resolution (see clause 10.1.11 in TS 38.133 [d]) | 0,,127 |
| A2 hysteresis | The hysteresis parameter as defined in reportConfigNR in TS 38.331 [c] for A2 event. The allowed value 0 . . . 30 times 0.5 dB to get the actual value. | 0 . . . 30 |
| A3 offeset RSRP | RSRP offset as defined in reportConfigNR in TS 38.331 [c] that is used as handover triggering condition for event A3. Allowed value 0 . . . 30 times 0.5 dB to get the actual value. | 0 . . . 30 |
| A3 offeset RSRQ | RSRQ offset as defined in reportConfigNR in TS 38.331 [c] that is used as handover triggering condition for event A3. Allowed value 0 . . . 30 times 0.5 dB to get the actual value. | 0 . . . 30 |
| A3 hysteresis range | The hysteresis parameter as defined in reportConfigNR in TS 38.331 [c] for A3 event. The allowed value 0 . . . 30 times 0.5 dB to get the actual value. | 0 . . . 30 |
| A4 threshold RSRP | RSRP Threshold as defined in reportConfigNR in TS 38.331 [c] that is used as handover triggering condition for event A4. Allowed value 0 . . . 127, mapping to the range of −156 dBm to −31 dBm with 1 dB resolution (see clause 10.1.6 in TS 38.133 [d]) | 0,,127 |
| A4 threshold RSRQ | RSRQ Threshold as defined in reportConfigNR in TS 38.331 [c] that is used as handover triggering condition for event A4. Allowed value 0 . . . 127, mapping to te range of −43 dB to 20 dB with 0.5 dB resolution (see clause 10.1.11 in TS 38.133 [d]) | 0,,127 |
| A4 hysteresis range | The hysteresis parameter as defined in reportConfigNR in TS 38.331 [c] for A4 event. The allowed value 0 . . . 30 times 0.5 dB to get the actual value. | 0 . . . 30 |

TABLE 7.2.x.2.2-3-continued

Handover parameters

| Control parameters | Definition | Legal Values |
|---|---|---|
| A5 threshold1 RSRP | RSRP Threshold1 as defined in reportConfigNR in TS 38.331 [c] that is used as handover triggering condition for event A5. Allowed value 0 . . . 127, mapping to the range of −156 dBm to −31 dBm with 1 dB resolution (see clause 10.1.6 in TS 38.133 [d]) | 0,,127 |
| A5 threshold1 RSRQ | RSRQ Threshold1 as defined in reportConfigNR in TS 38.331 [c] that is used as handover triggering condition for event A5. Allowed value 0 . . . 127, mapping to te range of −43 dB to 20 dB with 0.5 dB resolution (see clause 10.1.11 in TS 38.133 [d]) | 0,,127 |
| A5 threshold2 RSRP | RSRP Threshold2 as defined in reportConfigNR in TS 38.331 [c] that is used as handover triggering condition for event A5. Allowed value 0 . . . 127, mapping to the range of −156 dBm to −31 dBm with 1 dB resolution (see clause 10.1.6 in TS 38.133 [d]) | 0,,127 |
| A5 threshold2 RSRQ | RSRQ Threshold2 as defined in reportConfigNR in TS 38.331 [c] that is used as handover triggering condition for event A5. Allowed value 0 . . . 127, mapping to te range of −43 dB to 20 dB with 0.5 dB resolution (see clause 10.1.11 in TS 38.133 [d]) | 0,,127 |
| A5 hysteresis | The hysteresis parameter as defined in reportConfigNR in TS 38.331 [c] for A5 event. The allowed value 0 . . . 30 times 0.5 dB to get the actual value. | 0 . . . 30 |
| A6 offeset RSRP | RSRP offset as defined in reportConfigNR in TS 38.331 [c] that is used as handover triggering condition for event A6. Allowed value 0 . . . 30 times 0.5 dB to get the actual value. | 0 . . . 30 |
| A6 offeset RSRQ | RSRQ offset as defined in reportConfigNR in TS 38.331 [c] that is used as handover triggering condition for event A6. Allowed value 0 . . . 30 times 0.5 dB to get the actual value. | 0 . . . 30 |
| A6 hysteresis | The hysteresis parameter as defined in reportConfigNR in TS 38.331 [c] for A6 event. The allowed value 0 . . . 30 times 0.5 dB to get the actual value. | 0 . . . 30 |
| B1 threshold RSRP | RSRP Threshold as defined in reportConfigNR in TS 38.331 [c] that is used as handover triggering condition for event B1. Allowed value 0 . . . 97, mapping to the range of 140 dBm to −44 dBm with 1 dB resolution (see clause 9.1.4 in TS 36.133 [e]) | 0,,97 |
| B1 threshold RSRQ | RSRQ Threshold as defined in reportConfigNR in TS 38.331 [c] that is used as handover triggering condition for event B1. Allowed value 0 . . . 34, mapping to te range of −19.5 dB to −3 dB with 0.5 dB resolution (see clause 9.1.7 in TS 36.133 [e]) | 0,,34 |
| B1 hysteresis | The hysteresis parameter as defined in reportConfigNR in TS 38.331 [c] for B1 event. The allowed value 0 . . . 30 times 0.5 dB to get the actual value. | 0 . . . 30 |
| B2 threshold1 RSRP | RSRP Threshold1 as defined in reportConfigNR in TS 38.331 [c] that is used as handover triggering condition for event B2. Allowed value 0 . . . 127, mapping to the range of −156 dBm to −31 dBm with 1 dB resolution (see clause 10.1.6 in TS 38.133 [d]) | 0,,127 |
| B2 threshold1 RSRQ | RSRQ Threshold1 as defined in reportConfigNR in TS 38.331 [c] that is used as handover triggering condition for event B2. Allowed value 0 . . . 127, mapping to te range of −43 dB to 20 dB with 0.5 dB resolution (see clause 10.1.11 in TS 38.133 [d]) | 0,,127 |
| B2 threshold2 RSRP | RSRP Threshold2 as defined in reportConfigNR in TS 38.331 [c] that is used as handover triggering condition for event B2. Allowed value 0 . . . 97, mapping to the range of 140 dBm to −44 dBm with 1 dB resolution (see clause 9.1.4 in TS 36.133 [e]) | 0,,97 |

TABLE 7.2.x.2.2-3-continued

Handover parameters

| Control parameters | Definition | Legal Values |
|---|---|---|
| B2 threshold2 RSRQ | RSRQ Threshold2 as defined in reportConfigNR in TS 38.331 [c] that is used as handover triggering condition for event B2. Allowed value 0 . . . 34. mapping to te range of −19.5 dB to −3 dB with 0.5 dB resolution (see clause 9.1.7 in TS 36.133 [e]) | 0,,34 |
| B2 hysteresis | The hysteresis parameter as defined in reportConfigNR in TS 38.331 [c] for B2 event. The allowed value 0 . . . 30 times 0.5 dB to get the actual value. | 0 . . . 30 |

TABLE 7.2.x.2.2-4

Handover parameters ranges

| Control parameters | Definition | Legal Values |
|---|---|---|
| A1 threshold RSRP range | The range of RSRP Threshold as defined in reportConfigNR in TS 38.331 [c] that is used as handover triggering condition for event A1. Allowed value 0 . . . 127, mapping to the range of −156 dBm to −31 dBm with 1 dB resolution (see clause 10.1.6 in TS 38.133 [d]) | 0,,126-1 . . . 127 |
| A1 threshold RSRQ range | The range of RSRQ Threshold as defined in reportConfigNR in TS 38.331 [c] that is used as handover triggering condition for event A1. Allowed value 0 . . . 127, mapping to te range of −43 dB to 20 dB with 0.5 dB resolution (see clause 10.1.11 in TS 38.133 [d]) | 0,,126-1 . . . 127 |
| A1 hysteresis range | The range of the hysteresis parameter as defined in reportConfigNR in TS 38.331 [c] for A1 event. The allowed value 0 . . . 30 times 0.5 dB to get the actual value. | 0 . . . 29-1 . . . 30 |
| A2 threshold RSRP range | The range of RSRP Threshold as defined in reportConfigNR in TS 38.331 [c] that is used as handover triggering condition for event A2. Allowed value 0 . . . 127, mapping to the range of −156 dBm to −31 dBm with 1 dB resolution (see clause 10.1.6 in TS 38.133 [d]) | 0,,126-1 . . . 127 |
| A2 threshold RSRQ range | The range of RSRQ Threshold as defined in reportConfigNR in TS 38.331 [c] that is used as handover triggering condition for event A2. Allowed value 0 . . . 127, mapping to te range of −43 dB to 20 dB with 0.5 dB resolution (see clause 10.1.11 in TS 38.133 [d]) | 0,,126-1 . . . 127 |
| A2 hysteresis range | The range of the hysteresis parameter as defined in reportConfigNR in TS 38.331 [c] for A2 event. The allowed value 0 . . . 30 times 0.5 dB to get the actual value. | 0 . . . 29-1 . . . 30 |
| A3 offeset RSRP range | The range of RSRP offset as defined in reportConfigNR in TS 38.331 [c] that is used as handover triggering condition for event A3. Allowed value 0 . . . 30 times 0.5 dB to get the actual value. | 0 . . . 29-1 . . . 30 |
| A3 offeset RSRQ range | The range of RSRQ offset as defined in reportConfigNR in TS 38.331 [c] that is used as handover triggering condition for event A3. Allowed value 0 . . . 30 times 0.5 dB to get the actual value. | 0 . . . 29-1 . . . 30 |
| A3 hysteresis range | The range of the hysteresis parameter as defined in reportConfigNR in TS 38.331 [c] for A3 event. The allowed value 0 . . . 30 times 0.5 dB to get the actual value. | 0 . . . 29-1 . . . 30 |
| A4 threshold RSRP range | The range of RSRP Threshold as defined in reportConfigNR in TS 38.331 [c] that is used as handover triggering condition for event A4. Allowed value 0 . . . 127, mapping to the range of −156 dBm to −31 dBm with 1 dB resolution (see clause 10.1.6 in TS 38.133 [d]) | 0,,126-1 . . . 127 |
| A4 threshold RSRQ range | The range of RSRQ Threshold as defined in reportConfigNR in TS 38.331 [c] that is used as handover triggering condition for event A4. Allowed value 0 . . . 127, mapping to te range of −43 dB to 20 dB with 0.5 dB resolution (see clause 10.1.11 in TS 38.133 [d]) | 0,,126-1 . . . 127 |

TABLE 7.2.x.2.2-4-continued

Handover parameters ranges

| Control parameters | Definition | Legal Values |
|---|---|---|
| A4 hysteresis range | The range of the hysteresis parameter as defined in reportConfigNR in TS 38.331 [c] for A4 event. The allowed value 0 . . . 30 times 0.5 dB to get the actual value. | 0 . . . 29-1 . . . 30 |
| A5 threshold1 RSRP range | The range of RSRP Threshold1 as defined in reportConfigNR in TS 38.331 [c] that is used as handover triggering condition for event A5. Allowed value 0 . . . 127, mapping to the range of −156 dBm to −31 dBm with 1 dB resolution (see clause 10.1.6 in TS 38.133 [d]) | 0,,126-1 . . . 127 |
| A5 threshold1 RSRQ range | The range of RSRQ Threshold1 as defined in reportConfigNR in TS 38.331 [c] that is used as handover triggering condition for event A5. Allowed value 0 . . . 127, mapping to te range of −43 dB to 20 dB with 0.5 dB resolution (see clause 10.1.11 in TS 38.133 [d]) | 0,,126-1 . . . 127 |
| A5 threshold2 RSRP range | The range of RSRP Threshold2 as defined in reportConfigNR in TS 38.331 [c] that is used as handover triggering condition for event A5. Allowed value 0 . . . 127, mapping to the range of −156 dBm to −31 dBm with 1 dB resolution (see clause 10.1.6 in TS 38.133 [d]) | 0,,126-1 . . . 127 |
| A5 threshold2 RSRQ range | The range of RSRQ Threshold2 as defined in reportConfigNR in TS 38.331 [c] that is used as handover triggering condition for event A5. Allowed value 0 . . . 127, mapping to te range of −43 dB to 20 dB with 0.5 dB resolution (see clause 10.1.11 in TS 38.133 [d]) | 0,,126-1 . . . 127 |
| A5 hysteresis range | The range of the hysteresis parameter as defined in reportConfigNR in TS 38.331 [c] for A5 event. The allowed value 0 . . . 30 times 0.5 dB to get the actual value. | 0 . . . 29-1 . . . 30 |
| A6 offeset RSRP range | The range of RSRP offset as defined in reportConfigNR in TS 38.331 [c] that is used as handover triggering condition for event A6. Allowed value 0 . . . 30 times 0.5 dB to get the actual value. | 0 . . . 29-1 . . . 30 |
| A6 offeset RSRQ range | The range of RSRQ offset as defined in reportConfigNR in TS 38.331 [c] that is used as handover triggering condition for event A6. Allowed value 0 . . . 30 times 0.5 dB to get the actual value. | 0 . . . 29-1 . . . 30 |
| A6 hysteresis range | The range of the hysteresis parameter as defined in reportConfigNR in TS 38.331 [c] for A6 event. The allowed value 0 . . . 30 times 0.5 dB to get tire actual value. | 0 . . . 29-1 . . . 30 |
| B1 threshold RSRP range | The range of RSRP Threshold as defined in reportConfigNR in TS 38.331 [c] that is used as handover triggering condition for event B1. Allowed value 0 . . . 97, mapping to the range of 140 dBm to −44 dBm with 1 dB resolution (see clause 9.1.4 in TS 36.133 [e]) | 0,,96-1 . . . 97 |
| B1 threshold RSRQ range | The range of RSRQ Threshold as defined in reportConfigNR in TS 38.331 [c] that is used as handover triggering condition for event B1. Allowed value 0 . . . 34, mapping to te range of −19.5 dB to −3 dB with 0.5 dB resolution (see clause 9.1.7 in TS 36.133 [e]) | 0,,126-1 . . . 127 |
| B1 hysteresis range | The range of the hysteresis parameter as defined in reportConfigNR in TS 38.331 [c] for B1 event. The allowed value 0 . . . 30 times 0.5 dB to get the actual value. | 0 . . . 29-1 . . . 30 |
| B2 threshold1 RSRP range | The range of RSRP Threshold1 as defined in reportConfigNR in TS 38.331 [c] that is used as handover triggering condition for event B2. Allowed value 0 . . . 127, mapping to the range of −156 dBm to −31 dBm with 1 dB resolution (see clause 10.1.6 in TS 38.133 [d]) | 0,,126-1 . . . 127 |
| B2 threshold1 RSRQ range | The range of RSRQ Threshold1 as defined in reportConfigNR in TS 38.331 [c] that is used as handover triggering condition for event B2. Allowed value 0 . . . 127, mapping to te range of −43 dB to 20 dB with 0.5 dB resolution (see clause 10.1.11 in TS 38.133 [d]) | 0,,126-1 . . . 127 |
| B2 threshold2 RSRP range | The range of RSRP Threshold2 as defined in reportConfigNR in TS 38.331 [c] that is used as handover triggering condition for event B2. Allowed value 0 . . . 97, mapping to the range of 140 dBm to −44 dBm with 1 dB resolution (see clause 9.1.4 in TS 36.133 [e]) | 0,,96-1 . . . 97 |

TABLE 7.2.x.2.2-4-continued

Handover parameters ranges

| Control parameters | Definition | Legal Values |
|---|---|---|
| B2 threshold2 RSRQ range | The range of RSRQ Threshold2 as defined in reportConfigNR in TS 38.331 [c] that is used as handover triggering condition for event B2. Allowed value 0 . . . 34, mapping to te range of −19.5 dB to −3 dB with 0.5 dB resolution (see clause 9.1.7 in TS 36.133 [e]) | 0,,126-1 . . . 127 |
| B2 hysteresis range | The range of the hysteresis parameter as defined in reportConfigNR in TS 38.331 [c] for B2 event. The allowed value 0 . . . 30 times 0.5 dB to get the actual value. | 0 . . . 29-1 . . . 30 |

4.2.1.2.3. Performance Measurements

Performance measurements may include load related measurements and C-LBO performance related measurements, as shown in Table 7.2.x.2.3-1 and Table 7.2.x.2.3-2, TABLE 7.2.x.2.3-1

Load related measurements

| Performance measurements | Description | Note |
|---|---|---|
| DL Total PRB Usage | The total usage (in percentage) of physical resource blocks (PRBs) on the downlink. Refer to clause 5.1.1.2.1 in TS 28.552 [y]. | |
| UL Total PRB Usage | The total usage (in percentage) of physical resource blocks (PRBs) on the uplink, Refer to clause 5.1.1.2.1 in TS 28.552 [y]. | |
| Mean virtual CPU usage | Refer to clause 5.7.1.1.1 in TS 28.552 [y]. | |
| Mean virtual memory usage | Refer to clause 5.7.1.2.1 in TS 28.552 [y]. | |
| Mean virtual disk usage | Refer to clause 5.7.1.3.1 in TS 28.552 [y]. | |
| Mean number of RRC Connections | Refer to clause 5.1.1.4.1 in TS 28.552 [y]. | |

TABLE 7.2.x.2.3-2

C-LBO performance related measurements

| Performance measurements | Description | Note |
|---|---|---|
| Mean number of RRC Connections | Refer to clause 5.1.1.4.1 in TS 28.552 [y]. | |
| Attempted RRC connection establishments | Refer to clause 5.1.1.15.1 in TS 28.552 [y]. | |
| Successful RRC connection establishments | Refer to clause 5.1.1.15.2 in TS 28.552 [y]. | |
| Number of RRC connection re-establishment attempts | Refer to clause 5.1.1.17.1 in TS 28.552 [y]. | |
| Successful RRC connection re-establishment with UE context | Refer to clause 5.1.1.17.2 in TS 28.552 [y]. | |
| Successful RRC connection re-establishment without UE context | Refer to clause 5.1.1.17.3 in TS 28.552 [y]. | |
| Number of RRC connection resuming attempts | Refer to clause 5.1.1.18.1 in TS 28.552 [y]. | |
| Successful RRC connection resuming | Refer to clause 5.1.1.18.2 in TS 28.552 [y]. | |
| Number of requested handover preparations | Refer to clause 5.1.1.6.1.1 in TS 28.552 [y]. | |
| Number of failed handover preparations | Refer to clause 5.1.1.6.1.3 in TS 28.552 [y]. | |

TABLE 7.2.x.2.3-2-continued

C-LBO performance related measurements

| Performance measurements | Description | Note |
|---|---|---|
| Number of requested handover resource allocations | Refer to clause 5.1.1.6.1.4 in TS 28.552 [y]. | |
| Number of failed handover resource allocations | Refer to clause 5.1.1.6.1.6 in TS 28.552 [y]. | |
| Number of requested handover executions | Refer to clause 5.1.1.6.1.7 in TS 28.552 [y]. | |
| Number of failed handover executions | Refer to clause 5.1.1.6.1.9 in TS 28.552 [y]. | |
| Number of PDU Sessions requested to setup | Refer to clause 5.1.1.5.1 in TS 28.552 [y]. | |
| Number of PDU Sessions failed to setup | Refer to clause 5.1.1.5.3 in TS 28.552 [y]. | |

5. Systems and Implementations

Figure 5:
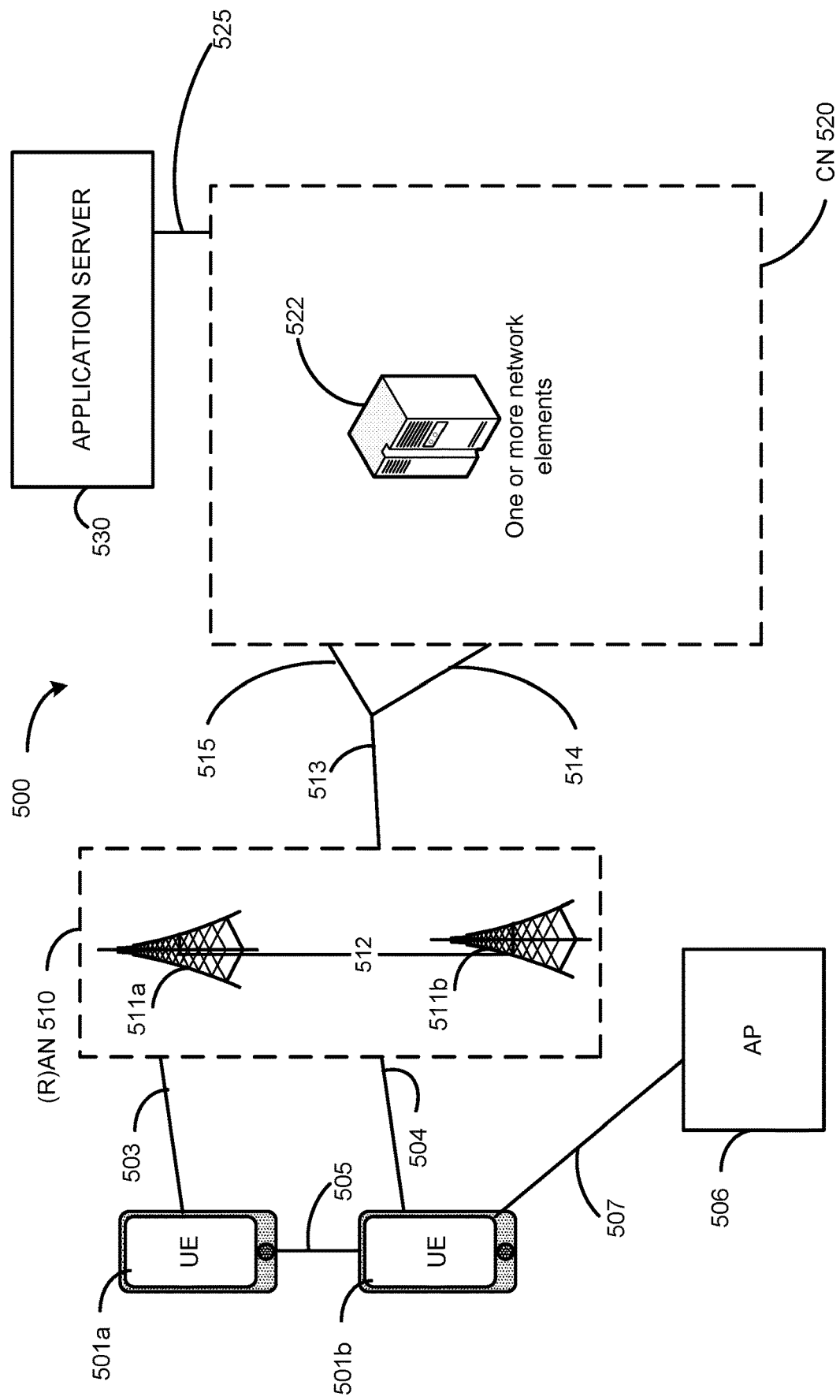
FIG. 5 illustrates an example architecture of a system of a network, in accordance with various embodiments.

FIG. 5 illustrates an example architecture of a system 500 of a network, in accordance with various embodiments. The following description is provided for an example system 500 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 5, the system 500 includes UE 501a and UE 501b (collectively referred to as "UEs 501" or "UE 501"). In this example, UEs 501 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 501 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 501 may be configured to connect, for example, communicatively couple, with an or RAN 510. In embodiments, the RAN 510 may be an NG RAN or a 5G RAN, an E-UTRAN, or a legacy RAN, such as a UTRAN or GERAN. As used herein, the term "NG RAN" or the like may refer to a RAN 510 that operates in an NR or 5G system 500, and the term "E-UTRAN" or the like may refer to a RAN 510 that operates in an LTE or 4G system 500. The UEs 501 utilize connections (or channels) 503 and 504, respectively, each of which comprises a physical communications interface or layer (discussed in further detail below).

In this example, the connections 503 and 504 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 501 may directly exchange communication data via a ProSe interface 505. The ProSe interface 505 may alternatively be referred to as a SL interface 505 and may comprise one or more logical channels, including but not limited to a PSCCH, a PSSCH, a PSDCH, and a PSBCH.

The UE 501b is shown to be configured to access an AP 506 (also referred to as "WLAN node 506," "WLAN 506," "WLAN Termination 506," "WT 506" or the like) via connection 507. The connection 507 can comprise a local wireless connection, such as a connection consistent with any IEEE 802.11 protocol, wherein the AP 506 would comprise a wireless fidelity (Wi-Fi®) router. In this example, the AP 506 is shown to be connected to the Internet without connecting to the core network of the wireless system (described in further detail below). In various embodiments, the UE 501b, RAN 510, and AP 506 may be configured to utilize LWA operation and/or LWIP operation. The LWA operation may involve the UE 501b in RRC_CONNECTED being configured by a RAN node 511a-b to utilize radio resources of LTE and WLAN. LWIP operation may involve the UE 501b using WLAN radio resources (e.g., connection 507) via IPsec protocol tunneling to authenticate and encrypt packets (e.g., IP packets) sent over the connection 507. IPsec tunneling may include encapsulating the entirety of original IP packets and adding a new packet header, thereby protecting the original header of the IP packets.

The RAN 510 can include one or more AN nodes or RAN nodes 511a and 511b (collectively referred to as "RAN nodes 511" or "RAN node 511") that enable the connections 503 and 504. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 511 that operates in an NR or 5G system 500 (for example, a gNB), and the term "E-UTRAN node" or the like may refer to a RAN node 511 that operates in an LTE or 4G system 500 (e.g., an eNB). According to various embodiments, the RAN nodes 511 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 511 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 511; a MAC/PHY split wherein RRC, PDCP, RLC, and MAC layers are operated by the CRAN/vBBUP and the PHY layer is operated by individual RAN nodes 511; or a "lower PHY" split wherein RRC, PDCP, RLC, MAC layers and upper portions of the PHY layer are operated by the CRAN/vBBUP and lower portions of the PHY layer are operated by individual RAN nodes 511. This virtualized framework allows the freed-up processor cores of the RAN nodes 511 to perform other virtualized applications. In some implementations, an individual RAN node 511 may represent individual gNB-DUs that are connected to a gNB-CU via individual F1 interfaces (not shown by FIG. 5). In these implementations, the gNB-DUs may include one or more remote radio heads or RFEMs (see, e.g., FIG. 6A), and the gNB-CU may be operated by a server that is located in the RAN 510 (not shown) or by a server pool in a similar manner as the CRAN/vBBUP. Additionally or alternatively, one or more of the RAN nodes 511 may be next generation eNBs (ng-eNBs), which are RAN nodes that provide E-UTRA user plane and control plane protocol terminations toward the UEs 501, and are connected to a 5GC (e.g., CN XR220 of Figure XR2) via an NG interface (discussed infra).

In V2X scenarios one or more of the RAN nodes 511 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 501 (vUEs 501). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 511 can terminate the air interface protocol and can be the first point of contact for the UEs 501. In some embodiments, any of the RAN nodes 511 can fulfill various logical functions for the RAN 510 including, but not limited to, radio network controller (RNC) functions such as radio bearer management, uplink and downlink dynamic radio resource management and data packet scheduling, and mobility management.

In embodiments, the UEs 501 can be configured to communicate using OFDM communication signals with each other or with any of the RAN nodes 511 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 511 to the UEs 501, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 501 and the RAN nodes 511 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 501 and the RAN nodes 511 may operate using LAA, eLAA, and/or feLAA mechanisms. In these implementations, the UEs 501 and the RAN nodes 511 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 501 RAN nodes 511, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 501, AP 506, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (ns); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 501 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 501. The PDCCH carries information about the transport format and resource allocations related to the PDSCH channel, among other things. It may also inform the UEs 501 about the transport format, resource allocation, and HARQ information related to the uplink shared channel. Typically, downlink scheduling (assigning control and shared channel resource blocks to the UE 501b within a cell) may be performed at any of the RAN nodes 511 based on channel quality information fed back from any of the UEs 501. The downlink resource assignment information may be sent on the PDCCH used for (e.g., assigned to) each of the UEs 501.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 511 may be configured to communicate with one another via interface 512. In embodiments where the system 500 is an LTE system, the interface 512 may be an X2 interface 512. The X2 interface may be defined between two or more RAN nodes 511 (e.g., two or more eNBs and the like) that connect to EPC 520, and/or between two eNBs connecting to EPC 520. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 501 from an SeNB for user data; information of PDCP PDUs that were not delivered to a UE 501; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 500 is a 5G or NR system (e.g., when CN 520 is an 5GC XR220 as in Figure XR2), the interface 512 may be an Xn interface 512. The Xn interface is defined between two or more RAN nodes 511 (e.g., two or more gNBs and the like) that connect to 5GC 520, between a RAN node 511 (e.g., a gNB) connecting to 5GC 520 and an eNB, and/or between two eNBs connecting to 5GC 520. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 501 in a connected mode (e.g., CM-CONNECTED) including functionality to manage the UE mobility for connected mode between one or more RAN nodes 511. The mobility support may include context transfer from an old (source) serving RAN node 511 to new (target) serving RAN node 511; and control of user plane tunnels between old (source) serving RAN node 511 to new (target) serving RAN node 511. A protocol stack of the Xn-U may include a transport network layer built on Internet Protocol (IP) transport layer, and a GTP—U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 510 is shown to be communicatively coupled to a core network—in this embodiment, core network (CN) 520. The CN 520 may comprise a plurality of network elements 522, which are configured to offer various data and telecommunications services to customers/subscribers (e.g., users of UEs 501) who are connected to the CN 520 via the RAN 510. The components of the CN 520 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 520 may be referred to as a network slice, and a logical instantiation of a portion of the CN 520 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 530 may be an element offering applications that use IP bearer resources with the core network (e.g., UMTS PS domain, LTE PS data services, etc.). The application server 530 can also be configured to support one or more communication services (e.g., VOID sessions, PTT sessions, group communication sessions, social networking services, etc.) for the UEs 501 via the EPC 520.

In embodiments, the CN 520 may be a 5GC (referred to as "5GC 520" or the like), and the RAN 510 may be connected with the CN 520 via an NG interface 513. In embodiments, the NG interface 513 may be split into two parts, an NG user plane (NG-U) interface 514, which carries traffic data between the RAN nodes 511 and a UPF, and the S1 control plane (NG-C) interface 515, which is a signaling interface between the RAN nodes 511 and AMFs. Embodiments where the CN 520 is a 5GC 520 are discussed in more detail with regard to Figure XR2.

In embodiments, the CN 520 may be a 5G CN (referred to as "5GC 520" or the like), while in other embodiments, the CN 520 may be an EPC). Where CN 520 is an EPC (referred to as "EPC 520" or the like), the RAN 510 may be connected with the CN 520 via an S1 interface 513. In embodiments, the S1 interface 513 may be split into two parts, an S1 user plane (S1-U) interface 514, which carries traffic data between the RAN nodes 511 and the S-GW, and the S1-MME interface 515, which is a signaling interface between the RAN nodes 511 and MMEs.

Figure 6A:
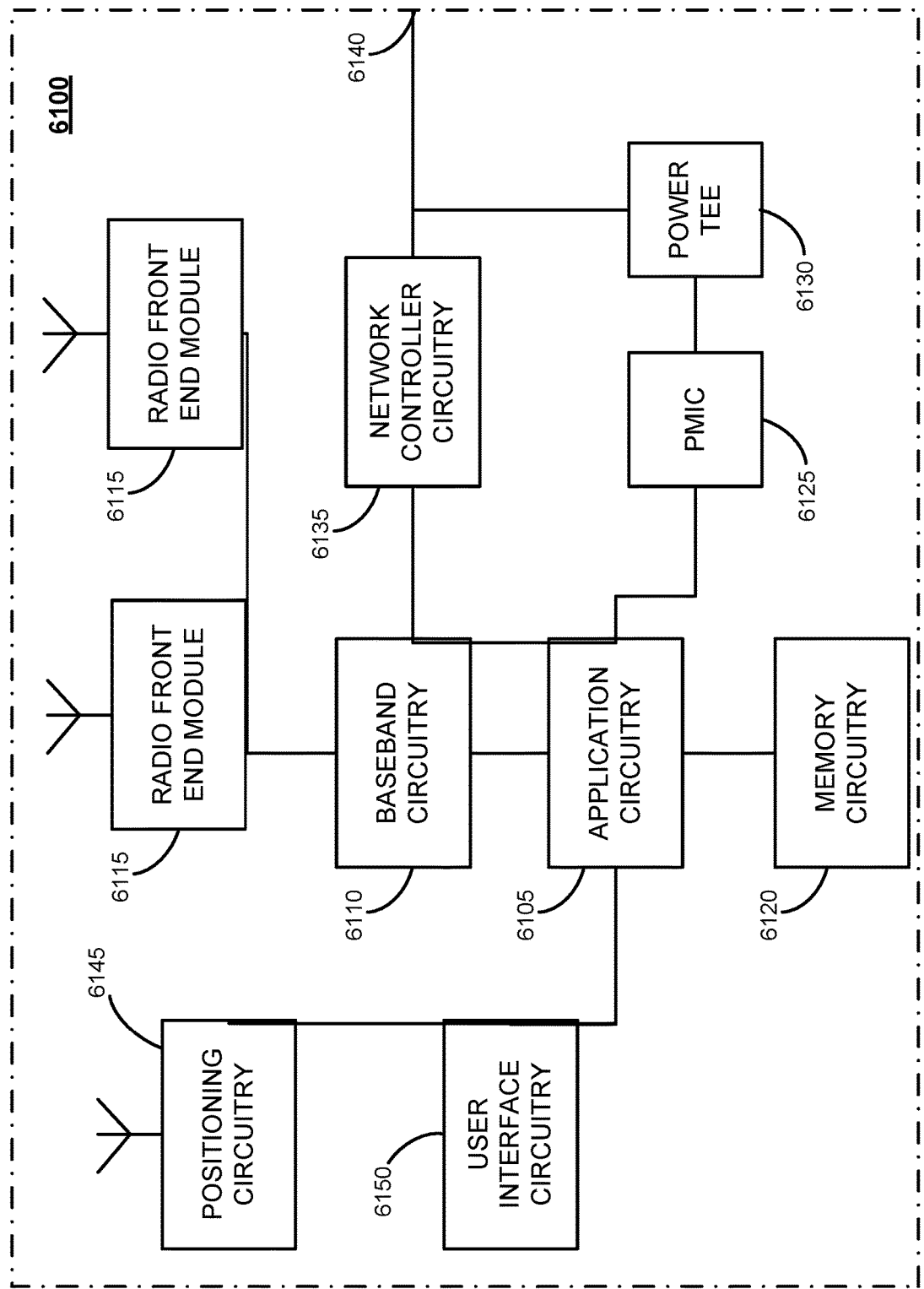
FIG. 6A illustrates an example of infrastructure equipment in accordance with various embodiments.

FIG. 6A illustrates an example of infrastructure equipment 6100 in accordance with various embodiments. The infrastructure equipment 6100 (or "system 6100") may be implemented as a base station, radio head, RAN node such as the RAN nodes 511 and/or AP 506 shown and described previously, application server(s) 530, and/or any other element/device discussed herein. In other examples, the system 6100 could be implemented in or by a UE.

The system 6100 includes application circuitry 6105, baseband circuitry 6110, one or more radio front end modules (RFEMs) 6115, memory circuitry 6120, power management integrated circuitry (PMIC) 6125, power tee circuitry 6130, network controller circuitry 6135, network interface connector 6140, satellite positioning circuitry 6145, and user interface 6150. In some embodiments, the device 6100 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 6105 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or JO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 6105 may be coupled with or may include memory/storage elements and may be configured to execute instructions stored in the memory/storage to enable various applications or operating systems to run on the system 6100. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 6105 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 6105 may comprise, or may be, a special-purpose processor/controller to operate according to the various embodiments herein. As examples, the processor(s) of application circuitry 6105 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 6100 may not utilize application circuitry 6105, and instead may include a special-purpose processor/controller to process IP data received from an EPC or 5GC, for example.

In some implementations, the application circuitry 6105 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 6105 may comprise logic blocks or logic fabric, and other interconnected resources that may be programmed to perform various functions, such as the procedures, methods, functions, etc. of the various embodiments discussed herein. In such embodiments, the circuitry of application circuitry 6105 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 6110 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 6110 are discussed infra with regard to Figure XT.

User interface circuitry 6150 may include one or more user interfaces designed to enable user interaction with the system 6100 or peripheral component interfaces designed to enable peripheral component interaction with the system 6100. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 6115 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 711 of Figure XT infra), and the RFEM may be connected to multiple antennas. In alternative implementations, both mmWave and sub-mmWave radio functions may be implemented in the same physical RFEM 6115, which incorporates both mmWave antennas and sub-mmWave.

The memory circuitry 6120 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 6120 may be implemented as one or more of solder down packaged integrated circuits, socketed memory modules and plug-in memory cards.

The PMIC 6125 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 6130 may provide for electrical power drawn from a network cable to provide both power supply and data connectivity to the infrastructure equipment 6100 using a single cable.

The network controller circuitry 6135 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 6100 via network interface connector 6140 using a physical connection, which may be electrical (commonly referred to as a "copper interconnect"), optical, or wireless. The network controller circuitry 6135 may include one or more dedicated processors and/or FPGAs to communicate using one or more of the aforementioned protocols. In some implementations, the network controller circuitry 6135 may include multiple controllers to provide connectivity to other networks using the same or different protocols.

The positioning circuitry 6145 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 6145 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 6145 may include a Micro-Technology for Positioning, Navigation, and Timing (Micro-PNT) IC that uses a master timing clock to perform position tracking/estimation without GNSS assistance. The positioning circuitry 6145 may also be part of, or interact with, the baseband circuitry 6110 and/or RFEMs 6115 to communicate with the nodes and components of the positioning network. The positioning circuitry 6145 may also provide position data and/or time data to the application circuitry 6105, which may use the data to synchronize operations with various infrastructure (e.g., RAN nodes 511, etc.), or the like.

The components shown by FIG. 6A may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I2C interface, an SPI interface, point to point interfaces, and a power bus, among others.

Figure 6B:
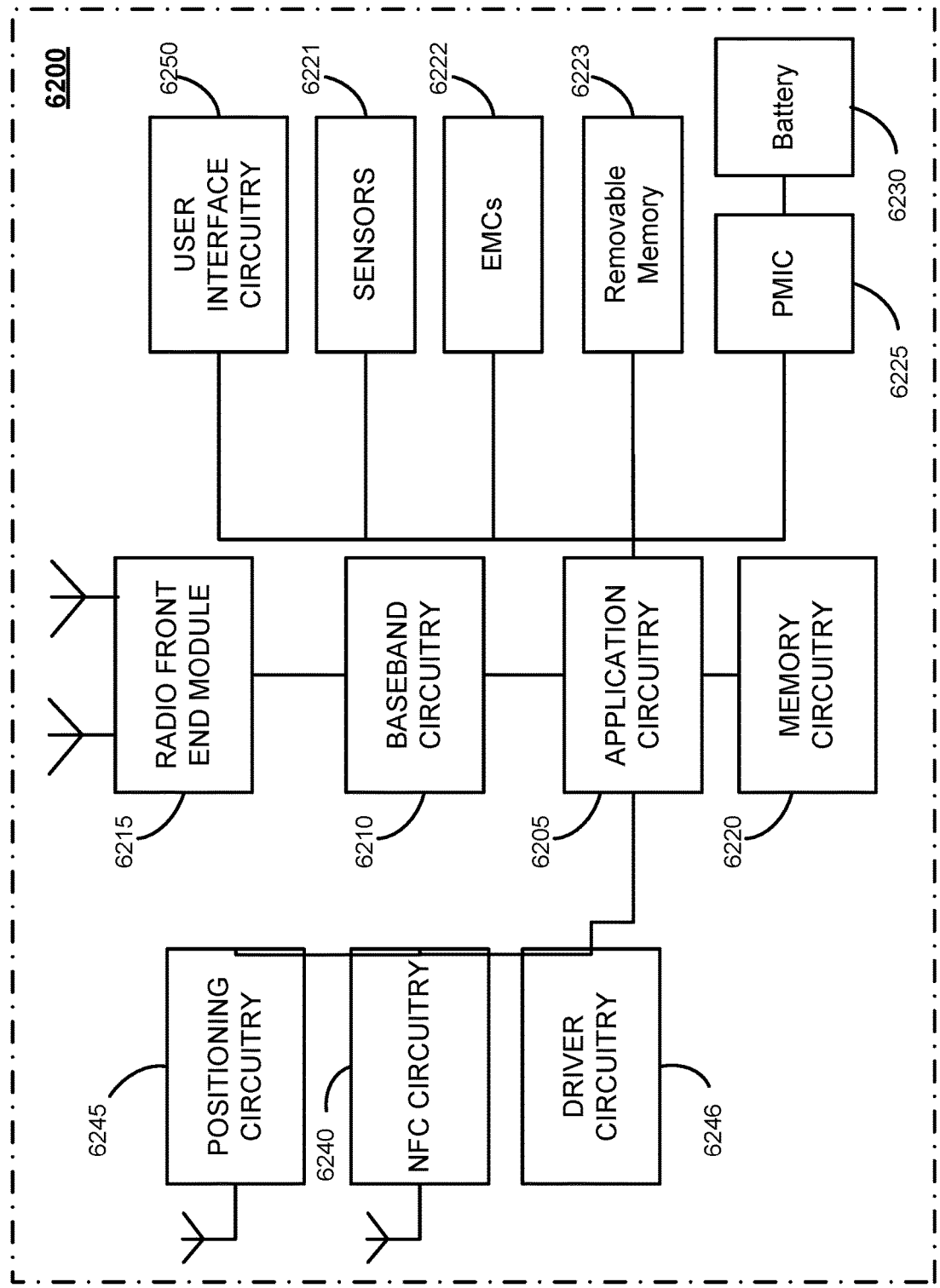
FIG. 6B illustrates an example of a computer platform in accordance with various embodiments.
Figure 7:
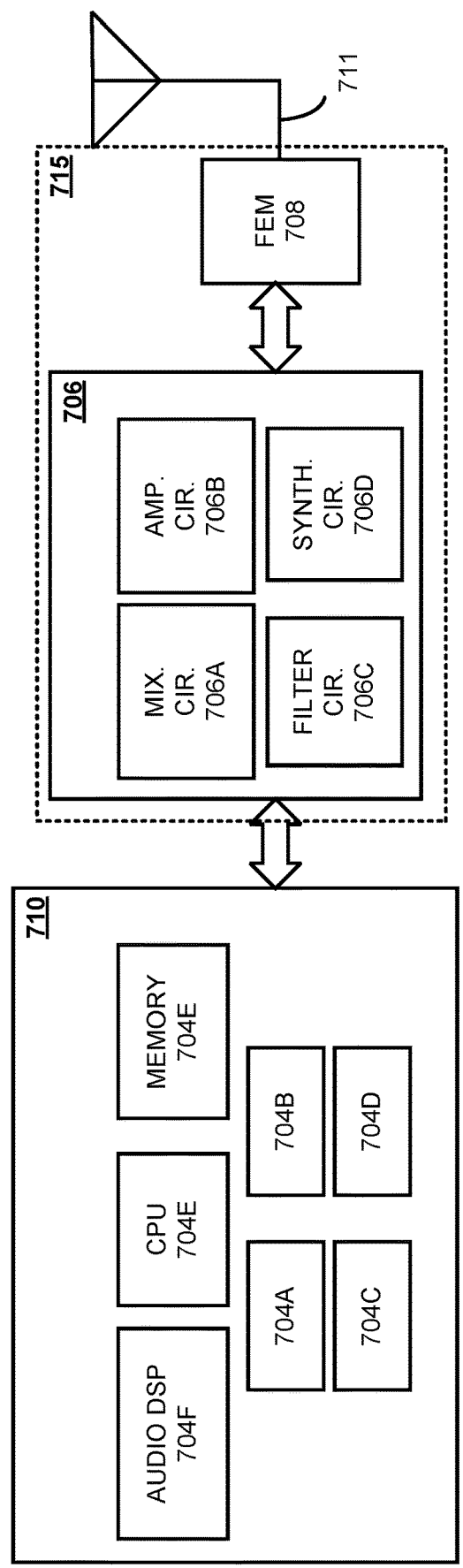
FIG. 7 illustrates example components of baseband circuitry and radio front end modules in accordance with various embodiments.

FIG. 6B illustrates an example of a platform 6200 (or "device 6200") in accordance with various embodiments. In embodiments, the computer platform 6200 may be suitable for use as UEs 501, XR101, XR201, application servers 530, and/or any other element/device discussed herein. The platform 6200 may include any combinations of the components shown in the example. The components of platform 6200 may be implemented as integrated circuits (ICs), portions thereof, discrete electronic devices, or other modules, logic, hardware, software, firmware, or a combination thereof adapted in the computer platform 6200, or as components otherwise incorporated within a chassis of a larger system. The block diagram of FIG. 6B is intended to show a high level view of components of the computer platform 6200. However, some of the components shown may be omitted, additional components may be present, and different arrangement of the components shown may occur in other implementations.

Application circuitry 6205 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 6205 may be coupled with or may include memory/storage elements and may be configured to execute instructions stored in the memory/storage to enable various applications or operating systems to run on the system 6200. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 6105 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 6105 may comprise, or may be, a special-purpose processor/controller to operate according to the various embodiments herein.

As examples, the processor(s) of application circuitry 6205 may include an Intel® Architecture Core™ based processor, such as a Quark™, an Atom™, an i3, an i5, an i7, or an MCU-class processor, or another such processor available from Intel® Corporation, Santa Clara, CA. The processors of the application circuitry 6205 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 6205 may be a part of a system on a chip (SoC) in which the application circuitry 6205 and other components are formed into a single integrated circuit, or a single package, such as the Edison™ or Galileo™ SoC boards from Intel® Corporation.

Additionally or alternatively, application circuitry 6205 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 6205 may comprise logic blocks or logic fabric, and other interconnected resources that may be programmed to perform various functions, such as the procedures, methods, functions, etc. of the various embodiments discussed herein. In such embodiments, the circuitry of application circuitry 6205 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 6210 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 6210 are discussed infra with regard to Figure XT.

The RFEMs 6215 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 711 of Figure XT infra), and the RFEM may be connected to multiple antennas. In alternative implementations, both mmWave and sub-mmWave radio functions may be implemented in the same physical RFEM 6215, which incorporates both mmWave antennas and sub-mmWave.

The memory circuitry 6220 may include any number and type of memory devices used to provide for a given amount of system memory. As examples, the memory circuitry 6220 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 6220 may be developed in accordance with a Joint Electron Devices Engineering Council (JEDEC) low power double data rate (LPDDR)-based design, such as LPDDR2, LPDDR3, LPDDR4, or the like. Memory circuitry 6220 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 6220 may be on-die memory or registers associated with the application circuitry 6205. To provide for persistent storage of information such as data, applications, operating systems and so forth, memory circuitry 6220 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 6200 may incorporate the three-dimensional (3D) cross-point (XPOINT) memories from Intel® and Micron®.

Removable memory circuitry 6223 may include devices, circuitry, enclosures/housings, ports or receptacles, etc. used to couple portable data storage devices with the platform 6200. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 6200 may also include interface circuitry (not shown) that is used to connect external devices with the platform 6200. The external devices connected to the platform 6200 via the interface circuitry include sensor circuitry 6221 and electro-mechanical components (EMCs) 6222, as well as removable memory devices coupled to removable memory circuitry 6223.

The sensor circuitry 6221 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 6222 include devices, modules, or subsystems whose purpose is to enable platform 6200 to change its state, position, and/or orientation, or move or control a mechanism or (sub)system. Additionally, EMCs 6222 may be configured to generate and send messages/signalling to other components of the platform 6200 to indicate a current state of the EMCs 6222. Examples of the EMCs 6222 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 6200 is configured to operate one or more EMCs 6222 based on one or more captured events and/or instructions or control signals received from a service provider and/or various clients.

In some implementations, the interface circuitry may connect the platform 6200 with positioning circuitry 6245. The positioning circuitry 6245 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 6245 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 6245 may include a Micro-PNT IC that uses a master timing clock to perform position tracking/estimation without GNSS assistance. The positioning circuitry 6245 may also be part of, or interact with, the baseband circuitry 6110 and/or RFEMs 6215 to communicate with the nodes and components of the positioning network. The positioning circuitry 6245 may also provide position data and/or time data to the application circuitry 6205, which may use the data to synchronize operations with various infrastructure (e.g., radio base stations), for turn-by-turn navigation applications, or the like In some implementations, the interface circuitry may connect the platform 6200 with Near-Field Communication (NFC) circuitry 6240. NFC circuitry 6240 is configured to provide contactless, short-range communications based on radio frequency identification (RFID) standards, wherein magnetic field induction is used to enable communication between NFC circuitry 6240 and NFC-enabled devices external to the platform 6200 (e.g., an "NFC touchpoint"). NFC circuitry 6240 comprises an NFC controller coupled with an antenna element and a processor coupled with the NFC controller. The NFC controller may be a chip/IC providing NFC functionalities to the NFC circuitry 6240 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 6240, or initiate data transfer between the NFC circuitry 6240 and another active NFC device (e.g., a smartphone or an NFC-enabled POS terminal) that is proximate to the platform 6200.

The driver circuitry 6246 may include software and hardware elements that operate to control particular devices that are embedded in the platform 6200, attached to the platform 6200, or otherwise communicatively coupled with the platform 6200. The driver circuitry 6246 may include individual drivers allowing other components of the platform 6200 to interact with or control various input/output (I/O) devices that may be present within, or connected to, the platform 6200. For example, driver circuitry 6246 may include a display driver to control and allow access to a display device, a touchscreen driver to control and allow access to a touchscreen interface of the platform 6200, sensor drivers to obtain sensor readings of sensor circuitry 6221 and control and allow access to sensor circuitry 6221, EMC drivers to obtain actuator positions of the EMCs 6222 and/or control and allow access to the EMCs 6222, a camera driver to control and allow access to an embedded image capture device, audio drivers to control and allow access to one or more audio devices.

The power management integrated circuitry (PMIC) 6225 (also referred to as "power management circuitry 6225") may manage power provided to various components of the platform 6200. In particular, with respect to the baseband circuitry 6210, the PMIC 6225 may control power-source selection, voltage scaling, battery charging, or DC-to-DC conversion. The PMIC 6225 may often be included when the platform 6200 is capable of being powered by a battery 6230, for example, when the device is included in a UE 501, XR101, XR201.

In some embodiments, the PMIC 6225 may control, or otherwise be part of, various power saving mechanisms of the platform 6200. For example, if the platform 6200 is in an RRC_Connected state, where it is still connected to the RAN node as it expects to receive traffic shortly, then it may enter a state known as Discontinuous Reception Mode (DRX) after a period of inactivity. During this state, the platform 6200 may power down for brief intervals of time and thus save power. If there is no data traffic activity for an extended period of time, then the platform 6200 may transition off to an RRC_Idle state, where it disconnects from the network and does not perform operations such as channel quality feedback, handover, etc. The platform 6200 goes into a very low power state and it performs paging where again it periodically wakes up to listen to the network and then powers down again. The platform 6200 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 6230 may power the platform 6200, although in some examples the platform 6200 may be mounted deployed in a fixed location, and may have a power supply coupled to an electrical grid. The battery 6230 may be a lithium ion battery, a metal-air battery, such as a zinc-air battery, an aluminum-air battery, a lithium-air battery, and the like. In some implementations, such as in V2X applications, the battery 6230 may be a typical lead-acid automotive battery.

In some implementations, the battery 6230 may be a "smart battery," which includes or is coupled with a Battery Management System (BMS) or battery monitoring integrated circuitry. The BMS may be included in the platform 6200 to track the state of charge (SoCh) of the battery 6230. The BMS may be used to monitor other parameters of the battery 6230 to provide failure predictions, such as the state of health (SoH) and the state of function (SoF) of the battery 6230. The BMS may communicate the information of the battery 6230 to the application circuitry 6205 or other components of the platform 6200. The BMS may also include an analog-to-digital (ADC) convertor that allows the application circuitry 6205 to directly monitor the voltage of the battery 6230 or the current flow from the battery 6230. The battery parameters may be used to determine actions that the platform 6200 may perform, such as transmission frequency, network operation, sensing frequency, and the like.

A power block, or other power supply coupled to an electrical grid may be coupled with the BMS to charge the battery 6230. In some examples, the power block 630 may be replaced with a wireless power receiver to obtain the power wirelessly, for example, through a loop antenna in the computer platform 6200. In these examples, a wireless battery charging circuit may be included in the BMS. The specific charging circuits chosen may depend on the size of the battery 6230, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 6250 includes various input/output (I/O) devices present within, or connected to, the platform 6200, and includes one or more user interfaces designed to enable user interaction with the platform 6200 and/or peripheral component interfaces designed to enable peripheral component interaction with the platform 6200. The user interface circuitry 6250 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 6200. The output device circuitry may also include speakers or other audio emitting devices, printer(s), and/or the like. In some embodiments, the sensor circuitry 6221 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 6200 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I2C interface, an SPI interface, point-to-point interfaces, and a power bus, among others.

Figure XT illustrates example components of baseband circuitry 710 and radio front end modules (RFEM) 715 in accordance with various embodiments. The baseband circuitry 710 corresponds to the baseband circuitry 6110 and 6210 of FIGS. 6A and 6B, respectively. The RFEM 715 corresponds to the RFEM 6115 and 6215 of FIGS. 6A and 6B, respectively. As shown, the RFEMs 715 may include Radio Frequency (RF) circuitry 706, front-end module (FEM) circuitry 708, antenna array 711 coupled together at least as shown.

The baseband circuitry 710 includes circuitry and/or control logic configured to carry out various radio/network protocol and radio control functions that enable communication with one or more radio networks via the RF circuitry 706. The radio control functions may include, but are not limited to, signal modulation/demodulation, encoding/decoding, radio frequency shifting, etc. In some embodiments, modulation/demodulation circuitry of the baseband circuitry 710 may include Fast-Fourier Transform (FFT), precoding, or constellation mapping/demapping functionality. In some embodiments, encoding/decoding circuitry of the baseband circuitry 710 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 710 is configured to process baseband signals received from a receive signal path of the RF circuitry 706 and to generate baseband signals for a transmit signal path of the RF circuitry 706. The baseband circuitry 710 is configured to interface with application circuitry 6105/6205 (see FIGS. 6A and 6B) for generation and processing of the baseband signals and for controlling operations of the RF circuitry 706. The baseband circuitry 710 may handle various radio control functions.

The aforementioned circuitry and/or control logic of the baseband circuitry 710 may include one or more single or multi-core processors. For example, the one or more processors may include a 3G baseband processor 704A, a 4G/LTE baseband processor 704B, a 5G/NR baseband processor 704C, or some other baseband processor(s) 704D for other existing generations, generations in development or to be developed in the future (e.g., sixth generation (6G), etc.). In other embodiments, some or all of the functionality of baseband processors 704A-D may be included in modules stored in the memory 704G and executed via a Central Processing Unit (CPU) 704E. In other embodiments, some or all of the functionality of baseband processors 704A-D may be provided as hardware accelerators (e.g., FPGAs, ASICs, etc.) loaded with the appropriate bit streams or logic blocks stored in respective memory cells. In various embodiments, the memory 704G may store program code of a real-time OS (RTOS), which when executed by the CPU 704E (or other baseband processor), is to cause the CPU 704E (or other baseband processor) to manage resources of the baseband circuitry 710, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 710 includes one or more audio digital signal processor(s) (DSP) 704F. The audio DSP(s) 704F include elements for compression/decompression and echo cancellation and may include other suitable processing elements in other embodiments.

In some embodiments, each of the processors 704A-704E include respective memory interfaces to send/receive data to/from the memory 704G. The baseband circuitry 710 may further include one or more interfaces to communicatively couple to other circuitries/devices, such as an interface to send/receive data to/from memory external to the baseband circuitry 710; an application circuitry interface to send/receive data to/from the application circuitry 6105/6205 of FIGS. 6A-XT); an RF circuitry interface to send/receive data to/from RF circuitry 706 of Figure XT; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 6225.

In alternate embodiments (which may be combined with the above described embodiments), baseband circuitry 710 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 710 may include protocol processing circuitry with one or more instances of control circuitry (not shown) to provide control functions for the digital baseband circuitry and/or radio frequency circuitry (e.g., the radio front end modules 715).

Although not shown by Figure XT, in some embodiments, the baseband circuitry 710 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 710 and/or RF circuitry 706 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 710 and/or RF circuitry 706 are part of a Wi-Fi communication system. In the second example, the protocol processing circuitry would operate Wi-Fi MAC and logical link control (LLC) functions. The protocol processing circuitry may include one or more memory structures (e.g., 704G) to store program code and data for operating the protocol functions, as well as one or more processing cores to execute the program code and perform various operations using the data. The baseband circuitry 710 may also support radio communications for more than one wireless protocol.

The various hardware elements of the baseband circuitry 710 discussed herein may be implemented, for example, as a solder-down substrate including one or more integrated circuits (ICs), a single packaged IC soldered to a main circuit board or a multi-chip module containing two or more ICs. In one example, the components of the baseband circuitry 710 may be suitably combined in a single chip or chipset, or disposed on a same circuit board. In another example, some or all of the constituent components of the baseband circuitry 710 and RF circuitry 706 may be implemented together such as, for example, a system on a chip (SoC) or System-in-Package (SiP). In another example, some or all of the constituent components of the baseband circuitry 710 may be implemented as a separate SoC that is communicatively coupled with and RF circuitry 706 (or multiple instances of RF circuitry 706). In yet another example, some or all of the constituent components of the baseband circuitry 710 and the application circuitry 6105/6205 may be implemented together as individual SoCs mounted to a same circuit board (e.g., a "multi-chip package").

In some embodiments, the baseband circuitry 710 may provide for communication compatible with one or more radio technologies. For example, in some embodiments, the baseband circuitry 710 may support communication with an E-UTRAN or other WMAN, a WLAN, a WPAN. Embodiments in which the baseband circuitry 710 is configured to support radio communications of more than one wireless protocol may be referred to as multi-mode baseband circuitry.

RF circuitry 706 may enable communication with wireless networks using modulated electromagnetic radiation through a non-solid medium. In various embodiments, the RF circuitry 706 may include switches, filters, amplifiers, etc. to facilitate the communication with the wireless network. RF circuitry 706 may include a receive signal path, which may include circuitry to down-convert RF signals received from the FEM circuitry 708 and provide baseband signals to the baseband circuitry 710. RF circuitry 706 may also include a transmit signal path, which may include circuitry to up-convert baseband signals provided by the baseband circuitry 710 and provide RF output signals to the FEM circuitry 708 for transmission.

In some embodiments, the receive signal path of the RF circuitry 706 may include mixer circuitry 706a, amplifier circuitry 706b and filter circuitry 706c. In some embodiments, the transmit signal path of the RF circuitry 706 may include filter circuitry 706c and mixer circuitry 706a. RF circuitry 706 may also include synthesizer circuitry 706d for synthesizing a frequency for use by the mixer circuitry 706a of the receive signal path and the transmit signal path. In some embodiments, the mixer circuitry 706a of the receive signal path may be configured to down-convert RF signals received from the FEM circuitry 708 based on the synthesized frequency provided by synthesizer circuitry 706d. The amplifier circuitry 706b may be configured to amplify the down-converted signals and the filter circuitry 706c may be a low-pass filter (LPF) or band-pass filter (BPF) configured to remove unwanted signals from the down-converted signals to generate output baseband signals. Output baseband signals may be provided to the baseband circuitry 710 for further processing. In some embodiments, the output baseband signals may be zero-frequency baseband signals, although this is not a requirement. In some embodiments, mixer circuitry 706a of the receive signal path may comprise passive mixers, although the scope of the embodiments is not limited in this respect.

In some embodiments, the mixer circuitry 706a of the transmit signal path may be configured to up-convert input baseband signals based on the synthesized frequency provided by the synthesizer circuitry 706d to generate RF output signals for the FEM circuitry 708. The baseband signals may be provided by the baseband circuitry 710 and may be filtered by filter circuitry 706c.

In some embodiments, the mixer circuitry 706a of the receive signal path and the mixer circuitry 706a of the transmit signal path may include two or more mixers and may be arranged for quadrature downconversion and upconversion, respectively. In some embodiments, the mixer circuitry 706a of the receive signal path and the mixer circuitry 706a of the transmit signal path may include two or more mixers and may be arranged for image rejection (e.g., Hartley image rejection). In some embodiments, the mixer circuitry 706a of the receive signal path and the mixer circuitry 706a of the transmit signal path may be arranged for direct downconversion and direct upconversion, respectively. In some embodiments, the mixer circuitry 706a of the receive signal path and the mixer circuitry 706a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 706 may include analog-to-digital converter (ADC) and digital-to-analog converter (DAC) circuitry and the baseband circuitry 710 may include a digital baseband interface to communicate with the RF circuitry 706.

In some dual-mode embodiments, a separate radio IC circuitry may be provided for processing signals for each spectrum, although the scope of the embodiments is not limited in this respect.

In some embodiments, the synthesizer circuitry 706d may be a fractional-N synthesizer or a fractional N/N+1 synthesizer, although the scope of the embodiments is not limited in this respect as other types of frequency synthesizers may be suitable. For example, synthesizer circuitry 706d may be a delta-sigma synthesizer, a frequency multiplier, or a synthesizer comprising a phase-locked loop with a frequency divider.

The synthesizer circuitry 706d may be configured to synthesize an output frequency for use by the mixer circuitry 706a of the RF circuitry 706 based on a frequency input and a divider control input. In some embodiments, the synthesizer circuitry 706d may be a fractional N/N+1 synthesizer.

In some embodiments, frequency input may be provided by a voltage controlled oscillator (VCO), although that is not a requirement. Divider control input may be provided by either the baseband circuitry 710 or the application circuitry 6105/6205 depending on the desired output frequency. In some embodiments, a divider control input (e.g., N) may be determined from a look-up table based on a channel indicated by the application circuitry 6105/6205.

Synthesizer circuitry 706d of the RF circuitry 706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 706d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 706 may include an IQ/polar converter.

FEM circuitry 708 may include a receive signal path, which may include circuitry configured to operate on RF signals received from antenna array 711, amplify the received signals and provide the amplified versions of the received signals to the RF circuitry 706 for further processing. FEM circuitry 708 may also include a transmit signal path, which may include circuitry configured to amplify signals for transmission provided by the RF circuitry 706 for transmission by one or more of antenna elements of antenna array 711. In various embodiments, the amplification through the transmit or receive signal paths may be done solely in the RF circuitry 706, solely in the FEM circuitry 708, or in both the RF circuitry 706 and the FEM circuitry 708.

In some embodiments, the FEM circuitry 708 may include a TX/RX switch to switch between transmit mode and receive mode operation. The EEM circuitry 708 may include a receive signal path and a transmit signal path. The receive signal path of the FEM circuitry 708 may include an LNA to amplify received RF signals and provide the amplified received RF signals as an output (e.g., to the RF circuitry 706). The transmit signal path of the I-BM circuitry 708 may include a power amplifier (PA) to amplify input RF signals (e.g., provided by RF circuitry 706), and one or more filters to generate RF signals for subsequent transmission by one or more antenna elements of the antenna array 711.

The antenna array 711 comprises one or more antenna elements, each of which is configured convert electrical signals into radio waves to travel through the air and to convert received radio waves into electrical signals. For example, digital baseband signals provided by the baseband circuitry 710 is converted into analog RF signals (e.g., modulated waveform) that will be amplified and transmitted via the antenna elements of the antenna array 711 including one or more antenna elements (not shown). The antenna elements may be omnidirectional, direction, or a combination thereof. The antenna elements may be formed in a multitude of arranges as are known and/or discussed herein. The antenna array 711 may comprise microstrip antennas or printed antennas that are fabricated on the surface of one or more printed circuit boards. The antenna array 711 may be formed in as a patch of metal foil (e.g., a patch antenna) in a variety of shapes, and may be coupled with the RF circuitry 706 and/or FEM circuitry 708 using metal transmission lines or the like.

Processors of the application circuitry 6105/6205 and processors of the baseband circuitry 710 may be used to execute elements of one or more instances of a protocol stack. For example, processors of the baseband circuitry 710, alone or in combination, may be used execute Layer 3, Layer 2, or Layer 1 functionality, while processors of the application circuitry 6105/6205 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

As used herein, the terms "instantiate," "instantiation," and the like may refer to the creation of an instance, and an "instance" may refer to a concrete occurrence of an object, which may occur, for example, during execution of program code. A network instance may refer to information identifying a domain, which may be used for traffic detection and routing in case of different IP domains or overlapping IP addresses. A network slice instance may refer to a set of network functions (NFs) instances and the resources (e.g., compute, storage, and networking resources) required to deploy the network slice.

With respect to 5G systems (see, e.g., Figure XR2), a network slice always comprises a RAN part and a CN part. The support of network slicing relies on the principle that traffic for different slices is handled by different PDU sessions. The network can realize the different network slices by scheduling and also by providing different L1/L2 configurations. The UE XR201 provides assistance information for network slice selection in an appropriate RRC message, if it has been provided by NAS. While the network can support large number of slices, the UE need not support more than 8 slices simultaneously.

A network slice may include the CN XR220 control plane and user plane NFs, NG-RANs XR210 in a serving PLMN, and a N3IWF functions in the serving PLMN. Individual network slices may have different S-NSSAI and/or may have different SSTs. NSSAI includes one or more S-NSSAIs, and each network slice is uniquely identified by an S-NSSAI. Network slices may differ for supported features and network functions optimizations, and/or multiple network slice instances may deliver the same service/features but for different groups of UEs XR201 (e.g., enterprise users). For example, individual network slices may deliver different committed service(s) and/or may be dedicated to a particular customer or enterprise. In this example, each network slice may have different S-NSSAIs with the same SST but with different slice differentiators. Additionally, a single UE may be served with one or more network slice instances simultaneously via a 5G AN and associated with eight different S-NSSAIs. Moreover, an AMF XR221 instance serving an individual UE XR201 may belong to each of the network slice instances serving that UE.

Network Slicing in the NG-RAN XR210 involves RAN slice awareness. RAN slice awareness includes differentiated handling of traffic for different network slices, which have been pre-configured. Slice awareness in the NG-RAN XR210 is introduced at the PDU session level by indicating the S-NSSAI corresponding to a PDU session in all signaling that includes PDU session resource information. How the NG-RAN XR210 supports the slice enabling in terms of NG-RAN functions (e.g., the set of network functions that comprise each slice) is implementation dependent. The NG-RAN XR210 selects the RAN part of the network slice using assistance information provided by the UE XR201 or the 5GC XR220, which unambiguously identifies one or more of the pre-configured network slices in the PLMN. The NG-RAN XR210 also supports resource management and policy enforcement between slices as per SLAs. A single NG-RAN node may support multiple slices, and the NG-RAN XR210 may also apply an appropriate RRM policy for the SLA in place to each supported slice. The NG-RAN XR210 may also support QoS differentiation within a slice.

The NG-RAN XR210 may also use the UE assistance information for the selection of an AMF XR221 during an initial attach, if available. The NG-RAN XR210 uses the assistance information for routing the initial NAS to an AMF XR221. If the NG-RAN XR210 is unable to select an AMF XR221 using the assistance information, or the UE XR201 does not provide any such information, the NG-RAN XR210 sends the NAS signaling to a default AMF XR221, which may be among a pool of AMFs XR221. For subsequent accesses, the UE XR201 provides a temp ID, which is assigned to the UE XR201 by the 5GC XR220, to enable the NG-RAN XR210 to route the NAS message to the appropriate AMF XR221 as long as the temp ID is valid. The NG-RAN XR210 is aware of, and can reach, the AMF XR221 that is associated with the temp ID. Otherwise, the method for initial attach applies.

The NG-RAN XR210 supports resource isolation between slices. NG-RAN XR210 resource isolation may be achieved by means of RRM policies and protection mechanisms that should avoid that shortage of shared resources if one slice breaks the service level agreement for another slice. In some implementations, it is possible to fully dedicate NG-RAN XR210 resources to a certain slice. How NG-RAN XR210 supports resource isolation is implementation dependent.

Some slices may be available only in part of the network. Awareness in the NG-RAN XR210 of the slices supported in the cells of its neighbors may be beneficial for inter-frequency mobility in connected mode. The slice availability may not change within the UE's registration area. The NG-RAN XR210 and the 5GC XR220 are responsible to handle a service request for a slice that may or may not be available in a given area. Admission or rejection of access to a slice may depend on factors such as support for the slice, availability of resources, support of the requested service by NG-RAN XR210.

The UE XR201 may be associated with multiple network slices simultaneously. In case the UE XR201 is associated with multiple slices simultaneously, only one signaling connection is maintained, and for intra-frequency cell reselection, the UE XR201 tries to camp on the best cell. For inter-frequency cell reselection, dedicated priorities can be used to control the frequency on which the UE XR201 camps. The 5GC XR220 is to validate that the UE XR201 has the rights to access a network slice. Prior to receiving an Initial Context Setup Request message, the NG-RAN XR210 may be allowed to apply some provisional/local policies, based on awareness of a particular slice that the UE XR201 is requesting to access. During the initial context setup, the NG-RAN XR210 is informed of the slice for which resources are being requested.

NFV architectures and infrastructures may be used to virtualize one or more NFs, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 8:
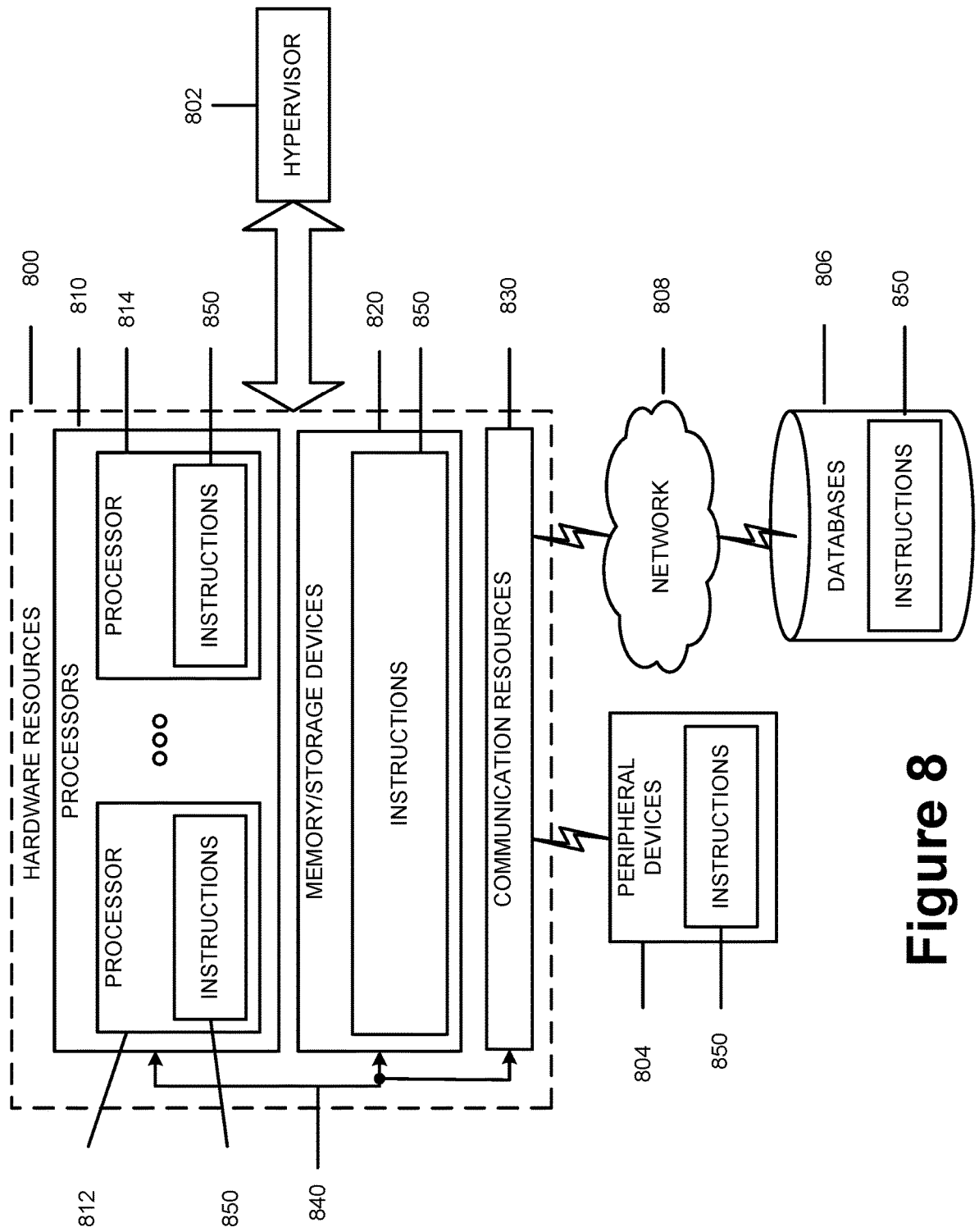
FIG. 8 is a block diagram illustrating components, according to some example embodiments, able to read instructions from a machine-readable or computer-readable medium (e.g., a non-transitory machine-readable storage medium) and perform any one or more of the methodologies discussed herein.

FIG. 8 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 8 shows a diagrammatic representation of hardware resources 800 including one or more processors (or processor cores) 810, one or more memory/storage devices 820, and one or more communication resources 830, each of which may be communicatively coupled via a bus 840. For embodiments where node virtualization (e.g., NFV) is utilized, a hypervisor 802 may be executed to provide an execution environment for one or more network slices/sub-slices to utilize the hardware resources 800.

The processors 810 may include, for example, a processor 812 and a processor 814. The processor(s) 810 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 820 may include main memory, disk storage, or any suitable combination thereof. The memory/storage devices 820 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 830 may include interconnection or network interface components or other suitable devices to communicate with one or more peripheral devices 804 or one or more databases 806 via a network 808. For example, the communication resources 830 may include wired communication components (e.g., for coupling via USB), cellular communication components, NFC components, Bluetooth® (or Bluetooth® Low Energy) components, Wi-Fi® components, and other communication components.

Instructions 850 may comprise software, a program, an application, an applet, an app, or other executable code for causing at least any of the processors 810 to perform any one or more of the methodologies discussed herein. The instructions 850 may reside, completely or partially, within at least one of the processors 810 (e.g., within the processor's cache memory), the memory/storage devices 820, or any suitable combination thereof. Furthermore, any portion of the instructions 850 may be transferred to the hardware resources 800 from any combination of the peripheral devices 804 or the databases 806. Accordingly, the memory of processors 810, the memory/storage devices 820, the peripheral devices 804, and the databases 806 are examples of computer-readable and machine-readable media.

6. Example Procedures

In some embodiments, the electronic device(s), network(s), system(s), chip(s) or component(s), or portions or implementations thereof, of FIGS. 5-8, or some other figure herein, may be configured to perform one or more processes, techniques, or methods as described herein, or portions thereof. One such process is depicted in FIG. 4A. For example, process 400 may include, at 405, retrieving load-related measurements for a plurality of new radio (NR) cells from a memory. The process further includes, at 410, determining, based on the load-related measurements, that load distribution optimization is necessary. The process further includes, at 415, executing, executing, based on determining that load distribution optimization is necessary, a load balancing optimization (LBO) function, wherein executing the LBO function includes changing one or more LBO parameters to optimize traffic load distributions among neighboring NR cells.

Another such process is illustrated in FIG. 4B. In this example, process 420 includes, at 425, collecting load-related measurements for a plurality of new radio (NR) cells. The process further includes, at 430, determining, based on the load-related measurements, that load distribution optimization is necessary. The process further includes, at 435, executing, based on determining that load distribution optimization is necessary, a load balancing optimization (LBO) function, wherein executing the LBO function includes changing one or more LBO parameters to optimize traffic load distributions among neighboring NR cells.

Another such process is illustrated in FIG. 4C. In this example, process 440 includes, at 445, receiving a request to enable a load balancing optimization (LBO) function from a management services (MnS) consumer of a centralized self-organizing network (C-SON). The process further includes, at 450, in response to receiving the request, enabling the LBO function. The process further includes, at 455, collecting load-related measurements for a plurality of new radio (NR) cells. The process further includes, at 460, determining, based on the load-related measurements, that load distribution optimization is necessary. The process further includes, at 465, executing, based on determining that load distribution optimization is necessary, the LBO function, wherein executing the LBO function includes changing one or more LBO parameters to optimize traffic load distributions among neighboring NR cells.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

7. Examples

Example 1 may include an apparatus of a New Radio (NR) network, the apparatus comprising: memory; and processing circuitry configured to operate as a Management Service (MnS) producer of distributed SON (D-SON) management, wherein when configured to support LBO (Load Balancing Optimization), the processing circuitry is to: receive a request from the MnS consumer of D-SON management to configure the LBO policy; consume the MnS of NF (Network Function) provisioning with modifyMOIAttributes operation to configure the policy of D-LBO function; receive a request from the MnS consumer of D-SON management to enable the D-LBO function; consume the MnS of NF provisioning with modifyMOIAttributes operation to enable the D-LBO function; receive a notification notifyMOIAttributeValueChange, from the MnS of NF provisioning, indicating that the handover parameters, handover parameter ranges, or cell reselection parameters have been changed; send a notification notifyMOIAttributeValueChange, to the MnS consumer of D-SON management, indicating that the handover parameters, handover parameter ranges, cell reselection parameters have been changed; collect the LBO performance related measurements from the MnS of performance assurance that are used to evaluate the D-LBO function performance; and analyze the measurements to determine if the LBO performance meets the target.

Example 2 may include the apparatus according to example 1 or some other example herein, wherein if the LBO performance does not meet the target, the MnS of D-SON management is configured to: consume the MnS of NF provisioning with modifyMOIAttributes operation to update the LBO parameters; send a notification notifyMOIAttributeValueChange, to the MnS consumer of D-SON management, indicating that the LBO parameters have been updated; send the LBO performance related measurements the MnS consumer of D-SON management; receive a request from the MnS consumer of D-SON management to update the LBO policy; and consume the MnS of NF provisioning with modifyMOIAttributes operation to update policy of D-LBO function.

Example 3 may include the apparatus according to example 1 or some other example herein, wherein the LBO policy includes targets and thresholds, as shown in the tables below:

TABLE 2

LBO thresholds

| Threshold parameters | Definition | Legal Values |
| --- | --- | --- |
| DL Total PRB Usage | This attribute describes the threshold to trigger LBO function. | [0 . . . 100] in unit percentage |
| Total PRB Usage | This attribute describes the threshold to trigger LBO function. | [0 . . . 100] in unit percentage |
| Mean virtual CPU usage | This attribute describes the threshold to trigger LBO function. | [0 . . . 100] in unit percentage |
| Mean virtual memory usage | This attribute describes the threshold to trigger LBO function. | [0 . . . 100] in unit percentage |
| Mean virtual disk usage | This attribute describes the threshold to trigger LBO function. | [0 . . . 100] in unit percentage |

Example 4 may include the apparatus according to example 1 or some other example herein, wherein upon receiving the policy configuration request from MnS of D-SON management, the MnS of NF provisioning sets the policy of D-LBO function at NR cell(s).

Example 5 may include the apparatus according to example 1 or some other example herein, wherein upon receiving the request to enable D-LBO function from MnS of D-SON management, the MnS of NF provisioning enable D-LBO function at NR cell(s).

Example 6 may include the apparatus according to example 1 or some other example herein, wherein upon receiving a report from D-LBO function indicating the LBO parameters have been changed, the MnS of NF provisioning sends a notification notifyMOIAttributeValueChange, to MnS of D-SON management indicating that the handover parameters, handover parameter ranges, or cell reselection parameters have been changed;

Example 7 may include an apparatus of a New Radio (NR) network, the apparatus comprising: memory; and processing circuitry configured to operate as a MnS producer of centralized SON (C-SON), wherein when configured to support LBO, the processing circuitry is to: receive a request from the MnS consumer of C-SON to enable the D-LBO function; consume the MnS of NF provisioning with

TABLE 1

LBO targets

| Target parameters | Definition | Legal Values |
| --- | --- | --- |
| Attempted RRC connection establishments successful rate | Successful RRC connection establishments/ Attempted RRC connection establishments | [0 . . . 100] in unit percentage |
| RRC connection re-establishment successful rate with UE context | RRC connection re-establishment with UE context/Number of RRC connection re-establishment attempts | [0 . . . 100] in unit percentage |
| RRC connection re-establishment successful rate without UE context | RRC connection re-establishment without UE context/Number of RRC connection re-establishment attempts | [0 . . . 100] in unit percentage |
| RRC connection resuming successful rate | Successful RRC connection resuming/ Number of RRC connection resuming attempts | [0 . . . 100] in unit percentage |
| Requested handover preparations failure rate | Number of failed handover preparations/ Number of requested handover preparations | [0 . . . 100] in unit percentage |
| Requested handover resource allocations failure rate | Number of failed handover resource allocations/Number of requested handover resource allocations | [0 . . . 100] in unit percentage |
| Requested handover executions faiure rate | Number of failed handover executions/ Number of requested handover executions | [0 . . . 100] in unit percentage | modifyMOIAttributes operation to enable the C-LBO function; collect the load related measurements from the MnS of performance assurance; and analyze the measurements to determine if it is necessary to optimize the traffic load distribution among NR cell(s).

Example 8 may include the apparatus according to example 7 or some other example herein, wherein the load related measurements used to determine if it is necessary to optimize the traffic load distribution among NR cell(s) may include measurements listed in the table below:

| Performance measurements | Description | Note |
|---|---|---|
| DL Total PRB Usage | The total usage (in percentage) of physical resource blocks (PRBs) on the downlink, Refer to clause 5.1.1.2.1 in TS 28.552 [y]. | |
| UL Total PRB Usage | The total usage (in percentage) of physical resource blocks (PRBs) on the uplink, Refer to clause 5.1.1.2.1 in TS 28.552 [y]. | |
| Mean virtual CPU usage | Refer to clause 5.7.1.1.1 in TS 28.552 [y]. | |
| Mean virtual memory usage | Refer to clause 5.7.1.2.1 in TS 28.552 [y]. | |
| Mean virtual disk usage | Refer to clause 5.7.1.3.1 in TS 28.552 [y]. | |
| Mean number of RRC Connections | Refer to clause 5.1.1.4.1 in TS 28.552 [y]. | |

Example 9 may include the apparatus according to example 7 or some other example herein, wherein if it is necessary to optimize the traffic load distribution among NR cell(s), the MnS of C-SON is configured to: consume the MnS of NF provisioning with modifyMOIAttributes operation to change the LBO parameters; send a notification notifyMOIAttributeValueChange, to the MnS consumer of C-SON, indicating that the LBO parameters have been changed; collect the LBO performance related measurements from the MnS of performance assurance that are used to evaluate the C-LBO function performance; and analyze the measurements to determine if the LBO performance meets the target.

Example 10 may include the apparatus according to example 9 or some other example herein, wherein if the LBO performance does not meet the target, the MnS of C-SON is configured to: consume the MnS of NF provisioning with modifyMOIAttributes operation to update the LBO parameters; and send a notification notifyMOIAttributeValueChange, to the MnS consumer of C-SON, indicating that the LBO parameters have been updated.

Example 11 may include the apparatus according to examples 2 and 10 or some other example herein, wherein upon receiving a request to change or update the LBO parameters, the MnS of NF provisioning change or update the LBO parameters at NR cell(s) accordingly.

Example 12 may include the apparatus according to examples 2, 10, and 11 or some other example herein, wherein the LBO parameters may include the handover parameters, handover parameter ranges, cell reselection parameters.

Example 13 may include the apparatus according to examples 1 and 9 or some other example herein, wherein the LBO performance related measurements that are used to evaluate the LBO performance may include measurements listed in the table below:

| Performance measurements | Description | Note |
|---|---|---|
| Mean number of RRC Connections | Refer to clause 5.1.1.4.1 in TS 28.552 [y]. | |
| Attempted RRC connection establishments | Refer to clause 5.1.1.15.1 in TS 28.552 [y]. | |
| Successful RRC connection establishments | Refer to clause 5.1.1.15.2 in TS 28.552 [y]. | |
| Number of RRC connection re-establishment attempts | Refer to clause 5.1.1.17.1 in TS 28.552 [y]. | |
| Successful RRC connection re-establishment with UE context | Refer to clause 5.1.1.17.2 in TS 28.552 [y]. | |
| Successful RRC connection re-establishment without UE context | Refer to clause 5.1.1.17.3 in TS 28.552 [y]. | |
| Number of RRC connection resuming attempts | Refer to clause 5.1.1.18.1 in TS 28.552 [y]. | |
| Successful RRC connection resuming | Refer to clause 5.1.1.18.2 in TS 28.552 [y]. | |
| Number of requested handover preparations | Refer to clause 5.1.1.6.1.1 in TS 28.552 [y]. | |
| Number of failed handover preparations | Refer to clause 5.1.1.6.1.3 in TS 28.552 [y]. | |
| Number of requested handover resource allocations | Refer to clause 5.1.1.6.1.4 in TS 28.552 [y]. | |
| Number of failed handover resource allocations | Refer to clause 5.1.1.6.1.6 in TS 28.552 [y]. | |
| Number of requested handover executions | Refer to clause 5.1.1.6.1.7 in TS 28.552 [y]. | |
| Number of failed handover executions | Refer to clause 5.1.1.6.1.9 in TS 28.552 [y]. | |
| Number of PDU Sessions requested to setup | Refer to clause 5.1.1.5.1 in TS 28.552 [y]. | |
| Number of PDU Sessions failed to setup | Refer to clause 5.1.1.5.3 in TS 28.552 [y]. | |

Example 14 includes a method comprising: collecting load-related measurements for a plurality of new radio (NR) cells; determining, based on the load-related measurements, that load distribution optimization is necessary; and executing, based on determining that load distribution optimization is necessary, a load balancing optimization (LBO) function.

Example 15 includes the method of example 14 or some other example herein, wherein at least a portion of the load-related measurements are based on a measured value for an NR cell crossing a threshold.

Example 16 includes the method of example 14 or some other example herein, wherein executing the LBO function includes changing one or more LBO parameters to optimize traffic load distributions among neighboring NR cells.

Example 17 includes the method of example 16 or some other example herein, wherein the LBO parameters include a handover parameter or a cell reselection parameter.

Example 17a includes the method of example 17 or some other example herein, wherein the method further includes: updating the handover parameter or the cell reselection parameter; and generating a notification that includes an indication of the update to the handover parameter or the cell reselection parameter.

Example 18 includes the method of example 16 or some other example herein, wherein the method further comprises generating a notification that includes an indication of the change to the one or more LBO parameters.

Example 19 includes the method of example 14 or some other example herein, further comprising collecting LBO performance measurements.

Example 20 includes the method of example 19 or some other example herein, wherein the LBO performance measurements include a number of established radio resource control (RRC) connections, a number of released radio resource control (RRC) connections, a number of abnormal releases, a number of handover failures, or a number of call drops.

Example 21 includes the method of any of examples 14-20 or some other example herein, wherein the method is performed at least in part by a management services (MnS) producer of distributed-self-organizing network (D-SON) management.

Example X1 includes an apparatus comprising: memory to store load-related measurements for a plurality of new radio (NR) cells; and processor circuitry, coupled with the memory, to: retrieve the load-related measurements from the memory; determine, based on the load-related measurements, that load distribution optimization is necessary; and execute, based on determining that load distribution optimization is necessary, a load balancing optimization (LBO) function, wherein executing the LBO function includes changing one or more LBO parameters to optimize traffic load distributions among neighboring NR cells.

Example X2 includes the apparatus of example X1 or some other example herein, wherein at least a portion of the load-related measurements are based on a measured value for an NR cell crossing a threshold.

Example X3 includes the apparatus of example X1 or some other example herein, wherein the LBO parameters include a handover parameter or a cell reselection parameter.

Example X4 includes the apparatus of example X3 or some other example herein, wherein the processor circuitry is further to: update the handover parameter or the cell reselection parameter; and generate a notification that includes an indication of the update to the handover parameter or the cell reselection parameter.

Example X5 includes the apparatus of example X1 or some other example herein, wherein the processing circuitry is further to generate a notification that includes an indication of the change to the one or more LBO parameters.

Example X6 includes the apparatus of example X1 or some other example herein, wherein the processing circuitry is further to collect LBO performance measurements.

Example X7 includes the apparatus of example X6 or some other example herein, wherein the LBO performance measurements include a number of established radio resource control (RRC) connections, a number of released RRC connections, a number of abnormal releases, a number of handover failures, or a number of call drops.

Example X8 includes one or more non-transitory computer-readable media storing instructions that, when executed by one or more processors, are to cause a next-generation NodeB (gNB) to: collect load-related measurements for a plurality of new radio (NR) cells; determine, based on the load-related measurements, that load distribution optimization is necessary; and execute, based on determining that load distribution optimization is necessary, a load balancing optimization (LBO) function, wherein executing the LBO function includes changing one or more LBO parameters to optimize traffic load distributions among neighboring NR cells.

Example X9 includes the one or more non-transitory computer-readable media of example X8 or some other example herein, wherein at least a portion of the load-related measurements are based on a measured value for an NR cell crossing a threshold.

Example X10 includes the one or more non-transitory computer-readable media of example X8 or some other example herein, wherein the LBO parameters include a handover parameter or a cell reselection parameter.

Example X11 includes the one or more non-transitory computer-readable media of example X10 or some other example herein, wherein the instructions are further to: update the handover parameter or the cell reselection parameter; and generate a notification that includes an indication of the update to the handover parameter or the cell reselection parameter.

Example X12 includes the one or more non-transitory computer-readable media of example X8 or some other example herein, wherein the instructions are further to generate a notification that includes an indication of the change to the one or more LBO parameters.

Example X13 includes the one or more non-transitory computer-readable media of example X8 or some other example herein, wherein the instructions are further to collect LBO performance measurements.

Example X14 includes the one or more non-transitory computer-readable media of example X13 or some other example herein, wherein the LBO performance measurements include a number of established radio resource control (RRC) connections, a number of released RRC connections, a number of abnormal releases, a number of handover failures, or a number of call drops.

Example X15 includes one or more non-transitory computer-readable media storing instructions that, when executed by one or more processors, are to cause a next-generation NodeB (gNB) to: receive a request to enable a load balancing optimization (LBO) function from a management services (MnS) consumer of a centralized self-organizing network (C-SON); in response to receiving the request, enable the LBO function; collect load-related measurements for a plurality of new radio (NR) cells; determine, based on the load-related measurements, that load distribution optimization is necessary; and execute, based on determining that load distribution optimization is necessary, the LBO function, wherein executing the LBO function includes changing one or more LBO parameters to optimize traffic load distributions among neighboring NR cells.

Example X16 includes the one or more non-transitory computer-readable media of example X15 or some other example herein, wherein at least a portion of the load-related measurements are based on a measured value for an NR cell crossing a threshold.

Example X17 includes the one or more non-transitory computer-readable media of example X15 or some other example herein, wherein the LBO parameters include a handover parameter or a cell reselection parameter.

Example X18 includes the one or more non-transitory computer-readable media of example X17 or some other example herein, wherein the instructions are further to: update the handover parameter or the cell reselection parameter; and generate a notification that includes an indication of the update to the handover parameter or the cell reselection parameter.

Example X19 includes the one or more non-transitory computer-readable media of example X15 or some other example herein, wherein the instructions are further to generate a notification that includes an indication of the change to the one or more LBO parameters.

Example X20 includes the one or more non-transitory computer-readable media of example X15 or some other example herein, wherein the instructions are further to collect LBO performance measurements, wherein the LBO performance measurements include a number of established radio resource control (RRC) connections, a number of released RRC connections, a number of abnormal releases, a number of handover failures, or a number of call drops.

Example Z01 may include an apparatus comprising means to perform one or more elements of a method described in or related to any of examples 1-X20, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples 1-X20, or any other method or process described herein.

Example Z03 may include an apparatus comprising logic, modules, or circuitry to perform one or more elements of a method described in or related to any of examples 1-X20, or any other method or process described herein.

Example Z04 may include a method, technique, or process as described in or related to any of examples 1-X20, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples 1-X20, or portions thereof.

Example Z06 may include a signal as described in or related to any of examples 1-X20, or portions or parts thereof.

Example Z07 may include a datagram, packet, frame, segment, protocol data unit (PDU), or message as described in or related to any of examples 1-X20, or portions or parts thereof, or otherwise described in the present disclosure.

Example Z08 may include a signal encoded with data as described in or related to any of examples 1-X20, or portions or parts thereof, or otherwise described in the present disclosure.

Example Z09 may include a signal encoded with a datagram, packet, frame, segment, protocol data unit (PDU), or message as described in or related to any of examples 1-X20, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples 1-X20, or portions thereof.

Example Z11 may include a computer program comprising instructions, wherein execution of the program by a processing element is to cause the processing element to carry out the method, techniques, or process as described in or related to any of examples 1-X20, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

8. Abbreviations

For the purposes of the present document, the following abbreviations may apply to the examples and embodiments discussed herein.

| Abbreviation | Definition |
|---|---|
| 3GPP | Third Generation Partnership Project |
| 4G | Fourth Generation |
| 5G | Fifth Generation |
| 5GC | 5G Core network |
| ACK | Acknowledgement |
| AF | Application Function |
| AM | Acknowledged Mode |
| AMBR | Aggregate Maximum Bit Rate |
| AMF | Access and Mobility Management Function |
| AN | Access Network |
| ANR | Automatic Neighbour Relation |
| AP | Application Protocol, Antenna Port, Access Point |
| API | Application Programming Interface |
| APN | Access Point Name |
| ARP | Allocation and Retention Priority |
| ARQ | Automatic Repeat Request |
| AS | Access Stratum |
| ASN.1 | Abstract Syntax Notation One |
| AUSF | Authentication Server Function |
| AWGN | Additive White Gaussian Noise |
| BAP | Backhaul Adaptation Protocol |
| BCH | Broadcast Channel |
| BER | Bit Error Ratio |
| BFD | Beam Failure Detection |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |
| C-RNTI | Cell Radio Network Temporary Identity |
| CA | Carrier Aggregation, Certification Authority |
| CAPEX | CAPital EXpenditure |
| CBRA | Contention Based Random Access |
| CC | Component Carrier, Country Code, Cryptographic Checksum |
| CCA | Clear Channel Assessment |
| CCE | Control Channel Element |
| CCCH | Common Control Channel |
| CE | Coverage Enhancement |
| CDM | Content Delivery Network |
| CDMA | Code-Division Multiple Access |
| CFRA | Contention Free Random Access |
| CG | Cell Group |
| CI | Cell Identity |
| CID | Cell-ID (e g., positioning method) |
| CIM | Common Information Model |
| CIR | Carrier to Interference Ratio |
| CK | Cipher Key |
| CM | Connection Management, Conditional Mandatory |
| CMAS | Commercial Mobile Alert Service |
| CMD | Command |
| CMS | Cloud Management System |
| CO | Conditional Optional |
| CoMP | Coordinated Multi-Point |
| CORESET | Control Resource Set |
| COTS | Commercial Off-The-Shelf |
| CP | Control Plane, Cyclic Prefix, Connection Point |
| CPD | Connection Point Descriptor |
| CPE | Customer Premise Equipment |
| CPICH | Common Pilot Channel |
| CQI | Channel Quality Indicator |
| CPU | CSI processing unit, Central Processing Unit |
| C/R | Command/Response field bit |
| CRAN | Cloud Radio Access Network, Cloud RAN |
| CRB | Common Resource Block |
| CRC | Cyclic Redundancy Check |
| CRI | Channel-State Information Resource Indicator, CSI-RS Resource Indicator |
| C-RNTI | Cell RNTI |
| CS | Circuit Switched |
| CSAR | Cloud Service Archive |
| CSI | Channel-State Information |
| CSI-IM | CSI Interference Measurement |
| CSI-RS | CSI Reference Signal |
| CSI-RSRP | CSI reference signal received power |
| CSI-RSRQ | CSI reference signal received quality |
| CSI-SINR | CSI signal-to-noise and interference ratio |
| CSMA | Carrier Sense Multiple Access |

| | |
|---|---|
| CSMA/CA | CSMA with collision avoidance |
| CSS | Common Search Space, Cell- specific Search Space |
| CTS | Clear-to-Send |
| CW | Codeword |
| CWS | Contention Window Size |
| D2D | Device-to-Device |
| DC | Dual Connectivity, Direct Current |
| DCI | Downlink Control Information |
| DF | Deployment Flavour |
| DL | Downlink |
| DMTF | Distributed Management Task Force |
| DPDK | Data Plane Development Kit |
| DM-RS, DMRS | Demodulation Reference Signal |
| DN | Data network |
| DRB | Data Radio Bearer |
| DRS | Discovery Reference Signal |
| DRX | Discontinuous Reception |
| DSL | Domain Specific Language. Digital Subscriber Line |
| DSLAM | DSL Access Multiplexer |
| DwPTS | Downlink Pilot Time Slot |
| E-LAN | Ethernet Local Area Network |
| E2E | End-to-End |
| ECCA | extended clear channel assessment, extended CCA |
| ECCE | Enhanced Control Channel Element, Enhanced CCE |
| ED | Energy Detection |
| EDGE | Enhanced Datarates for GSM Evolution (GSM Evolution) |
| EGMF | Exposure Governance Management Function |
| EGPRS | Enhanced GPRS |
| EIR | Equipment Identity Register |
| eLAA | enhanced Licensed Assisted Access, enhanced LAA |
| EM | Element Manager |
| eMBB | Enhanced Mobile Broadband |
| EMS | Element Management System |
| eNB | evolved NodeB, E-UTRAN Node B |
| EN-DC | E-UTRA-NR Dual Connectivity |
| EPC | Evolved Packet Core |
| EPDCCH | enhanced PDCCH, enhanced Physical Downlink Control Cannel |
| EPRE | Energy per resource element |
| EPS | Evolved Packet System |
| EREG | enhanced REG, enhanced resource element groups |
| ETSI | European Telecommunications Standards Institute |
| ETWS | Earthquake and Tsunami Warning System |
| eUICC | embedded UICC, embedded Universal Integrated Circuit Card |
| E-UTRA | Evolved UTRA |
| E-UTRAN | Evolved UTRAN |
| EV2X | Enhanced V2X |
| F1AP | F1 Application Protocol |
| F1-C | F1 Control plane interface |
| F1-U | F1 User plane interface |
| FACCH | Fast Associated Control CHannel |
| FACCH/F | Fast Associated Control Channel/Full rate |
| FACCH/H | Fast Associated Control Channel/Half rate |
| FACH | Forward Access Channel |
| FAUSCH | Fast Uplink Signalling Channel |
| FB | Functional Block |
| FBI | Feedback Information |
| FCC | Federal Communications Commission |
| FCCH | Frequency Correction CHannel |
| FDD | Frequency Division Duplex |
| FDM | Frequency Division Multiplex |
| FDMA | Frequency Division Multiple Access |
| FE | Front End |
| FEC | Forward Error Correction |
| FFS | For Further Study |
| FFT | Fast Fourier Transformation |
| feLAA | further enhanced Licensed Assisted Access, further enhanced LAA |
| FN | Frame Number |
| FPGA | Field-Programmable Gate Array |
| FR | Frequency Range |
| G-RNTI | GERAN Radio Network Temporary Identity |
| GERAN | GSM EDGE RAN, GSM EDGE Radio Access Network |
| GGSN | Gateway GPRS Support Node |
| GLONASS | GLObal'naya NAvigatsionnaya Sputnikovaya Sistema (Engl.: Global Navigation Satellite System) |
| gNB | Next Generation NodeB |
| gNB-CU | gNB-centralized unit, Next Generation NodeB centralized unit |
| gNB-DU | gNB-distributed unit, Next Generation NodeB distributed unit |
| GNSS | Global Navigation Satellite System |
| GPRS | General Packet Radio Service |
| GSM | Global System for Mobile Communications, Groupe Spécial Mobile |
| GTP | GPRS Tunneling Protocol |
| GTP-UGPRS | Tunnelling Protocol for User Plane |
| GTS | Go To Sleep Signal (related toWUS) |
| GUMMEI | Globally Unique MME Identifier |
| GUTI | Globally Unique Temporary UE Identity |
| HARQ | Hybrid ARQ, Hybrid Automatic Repeat Request |
| HANDO | Handover |
| HFN | HyperFrame Number |
| HHO | Hard Handover |
| HLR | Home Location Register |
| HN | Home Network |
| HO | Handover |
| HPLMN | Home Public Land Mobile Network |
| HSDPA | High Speed Downlink Packet Access |
| HSN | Hopping Sequence Number |
| HSPA | High Speed Packet Access |
| HSS | Home Subscriber Server |
| HSUPA | High Speed Uplink Packet Access |
| HTTP | Hyper Text Transfer Protocol |
| HTTPS | Hyper Text Transfer Protocol Secure (https is http/1.1 over SSL, i.e. port 443) |
| I-Block | Information Block |
| ICCID | Integrated Circuit Card Identification |
| IAB | Integrated Access and Backhaul |
| ICIC | Inter-Cell Interference Coordination |
| ID | Identity, identifier |
| IDFT | Inverse Discrete Fourier Transform |
| IE | Information element |
| IBE | In-Band Emission |
| IEEE | Institute of Electrical and Electronics Engineers |
| IEI | Information Element Identifier |
| IEIDL | Information Element Identifier Data Length |
| IETF | Internet Engineering Task Force |
| IF | Infrastructure |
| IM | Interference Measurement, Intermodulation, IP Multimedia |
| IMC | IMS Credentials |
| IMEI | International Mobile Equipment Identity |
| IMGI | International mobile group identity |
| IMPI | IP Multimedia Private Identity |
| IMPU | IP Multimedia PUblic identity |
| IMS | IP Multimedia Subsystem |
| IMSI | International Mobile Subscriber Identity |
| IoT | Internet of Things |
| IP | Internet Protocol |
| Ipsec | IP Security, Internet Protocol Security |
| IP-CAN | IP-Connectivity Access Network |
| IP-M | IP Multicast |
| IPv4 | Internet Protocol Version 4 |
| IPv6 | Internet Protocol Version 6 |
| IR | Infrared |
| IS | In Sync |
| IRP | Integration Reference Point |
| ISDN | Integrated Services Digital Network |
| ISIM | IM Services Identity Module |
| ISO | International Organisation for Standardisation |
| ISP | Internet Service Provider |
| IWF | Interworking-Function |
| I-WLAN | Interworking WLAN |
| | Constraint length of the convolutional code, USIM Individual key |
| kB | Kilobyte (1000 bytes) |
| kbps | kilo-bits per second |
| Kc | Ciphering key |
| Ki | Individual subscriber authentication key |
| KPI | Key Performance Indicator |
| KQI | Key Quality Indicator |
| KSI | Key Set Identifier |
| ksps | kilo-symbols per second |
| KVM | Kernel Virtual Machine |
| L1 | Layer 1 (physical layer) |

| | |
|---|---|
| L1-RSRP | Layer 1 reference signal received power |
| L2 | Layer 2 (data link layer) |
| L3 | Layer 3 (network layer) |
| LAA | Licensed Assisted Access |
| LAN | Local Area Network |
| LBT | Listen Before Talk |
| LCM | LifeCycle Management |
| LCR | Low Chip Rate |
| LCS | Location Services |
| LCID | Logical Channel ID |
| LI | Layer Indicator |
| LLC | Logical Link Control, Low Layer Compatibility |
| LPLMN | Local PLMN |
| LPP | LTE Positioning Protocol |
| LSB | Least Significant Bit |
| LTE | Long Term Evolution |
| LWA | LTE-WLAN aggregation |
| LWIP | LTE/WLAN Radio Level Integration with IPsec Tunnel |
| LTE | Long Term Evolution |
| M2M | Machine-to-Machine |
| MAC | Medium Access Control (protocol layering context) |
| MAC | Message authentication code (security/encryption context) |
| MAC-A | MAC used for authentication and key agreement (TSG T WG3 context) |
| MAC-IMAC | used for data integrity of signalling messages (TSG T WG3 context) |
| MANO | Management and Orchestration |
| MBMS | Multimedia Broadcast and Multicast Service |
| MBSFN | Multimedia Broadcast multicast service Single Frequency Network |
| MCC | Mobile Country Code |
| MCG | Master Cell Group |
| MCOT | Maximum Channel Occupancy Time |
| MCS | Modulation and coding scheme |
| MDAF | Management Data Analytics Function |
| MDAS | Management Data Analytics Service |
| MDT | Minimization of Drive Tests |
| ME | Mobile Equipment |
| MeNB | master eNB |
| MER | Message Error Ratio |
| MGL | Measurement Gap Length |
| MGRP | Measurement Gap Repetition Period |
| MIB | Master Information Block, Management Information Base |
| MIMO | Multiple Input Multiple Output |
| MLC | Mobile Location Centre |
| MM | Mobility Management |
| MME | Mobility Management Entity |
| MN | Master Node |
| MO | Measurement Object, Mobile Originated |
| MPBCH | MTC Physical Broadcast CHannel |
| MPDCCH | MTC Physical Downlink Control CHannel |
| MPDSCH | MTC Physical Downlink Shared CHannel |
| MPRACH | MTC Physical Random Access CHannel |
| MPUSCH | MTC Physical Uplink Shared Channel |
| MPLS | MultiProtocol Label Switching |
| MS | Mobile Station |
| MSB | Most Significant Bit |
| MSC | Mobile Switching Centre |
| MSI | Minimum System Information, MCH Scheduling Information |
| MSID | Mobile Station Identifier |
| MSIN | Mobile Station Identification Number |
| MSISDN | Mobile Subscriber ISDN Number |
| MT | Mobile Terminated, Mobile Termination |
| MTC | Machine-Type Communications |
| mMTC | massive MTC, massive Machine-Type Communications |
| MU-MIMO | Multi User MIMO |
| MWUS | MTC wake-up signal, MTC WUS |
| NACK | Acknowledgement |
| NAI | Network Access Identifier |
| NAS | Non-Access Stratum, Non- Access Stratum layer |
| NCT | Network Connectivity Topology |
| NC-JT | Non-Coherent Joint Transmission |
| NEC | Network Capability Exposure |
| NE-DC | NR-E-UTRA Dual Connectivity |
| NEF | Network Exposure Function |
| NF | Network Function |
| NFP | Network Forwarding Path |
| NFPD | Network Forwarding Path Descriptor |
| NFV | Network Functions Virtualization |
| NFVI | NFV Infrastructure |
| NFVO | NFV Orchestrator |
| NG | Next Generation, Next Gen |
| NGEN-DC | NG-RAN E-UTRA-NR Dual Connectivity |
| NM | Network Manager |
| NMS | Network Management System |
| N-PoP | Network Point of Presence |
| NMIB, N-MIB | Narrowband MIB |
| NPBCH | Narrowband Physical Broadcast CHannel |
| NPDCCH | Narrowband Physical Downlink Control CHannel |
| NPDSCH | Narrowband Physical Downlink Shared CHannel |
| NPRACH | Narrowband Physical Random Access CHannel |
| NPUSCH | Narrowband Physical Uplink Shared CHannel |
| NPSS | Narrowband Primary Synchronization Signal |
| NSSS | Narrowband Secondary Synchronization Signal |
| NR | New Radio, Neighbour Relation |
| NRF | Function |
| NRS | Narrowband Reference Signal |
| NS | Network Service |
| NSA | Non-Standalone operation mode |
| NSD | Network Service Descriptor |
| NSR | Network Service Record |
| NSSAI | Network Slice Selection Assistance Information |
| S-NNSAI | Single-NSSAI |
| NSSF | Network Slice Selection Function |
| NW | Network |
| NWUS | Narrowband wake-up signal, Narrowband WUS |
| NZP | Non-Zero Power |
| O&M | Operation and Maintenance |
| ODU2 | Optical channel Data Unit - type 2 |
| OFDM | Orthogonal Frequency Division Multiplexing |
| OFDMA | Orthogonal Frequency Division Multiple Access |
| OOB | Out-of-band |
| OOS | Out of Sync |
| OPEX | OPerating EXpense |
| OSI | Other System Information |
| OSS | Operations Support System |
| OTA | over-the-air |
| PAPR | Peak-to-Average Power Ratio |
| PAR | Peak to Average Ratio |
| PBCH | Physical Broadcast Channel |
| PC | Power Control, Personal Computer |
| PCC | Primary Component Carrier, Primary CC |
| PCell | Primary Cell |
| PCI | Physical Cell ID, Physical Cell Identity |
| PCEF | Policy and Charging Enforcement Function |
| PCF | Policy Control Function |
| PCRF | Policy Control and Charging Rules Function |
| PDCP | Packet Data Convergence Protocol, Packet Data Convergence Protocol layer |
| PDCCH | Physical Downlink Control Channel |
| PDCP | Packet Data Convergence Protocol |
| PDN | Packet Data Network, Public Data Network |
| PDSCH | Physical Downlink Shared Channel |
| PDU | Protocol Data Unit |
| PEI | Permanent Equipment Identifiers |
| PFD | Packet Flow Description |
| P-GW | PDN Gateway |
| PHICH | Physical hybrid-ARQ indicator channel |
| PHY | Physical layer |
| PLMN | Public Land Mobile Network |
| PIN | Personal Identification Number |
| PM | Performance Measurement |
| PMI | Precoding Matrix Indicator |
| PNF | Physical Network Function |
| PNFD | Physical Network Function Descriptor |
| PNFR | Physical Network Function Record |
| POC | PTT over Cellular PP, PTP Point-to-Point |
| PPP | Point-to-Point Protocol |
| PRACH | Physical RACH |
| PRB | Physical resource block |
| PRG | Physical resource block group |
| ProSe | Proximity Services, Proximity-Based Service |
| PRS | Positioning Reference Signal |
| PRR | Packet Reception Radio |
| PS | Packet Services |
| PSBCH | Physical Sidelink Broadcast Channel |
| PSDCH | Physical Sidelink Downlink Channel |

| | |
|---|---|
| PSCCH | Physical Sidelink Control Channel |
| PSSCH | Physical Sidelink Shared Channel |
| PSCell | Primary SCell |
| PSS | Primary Synchronization Signal |
| PSTN | Public Switched Telephone Network |
| PT-RS | Phase-tracking reference signal |
| PTT | Push-to-Talk |
| PUCCH | Physical Uplink Control Channel |
| PUSCH | Physical Uplink Shared Channel |
| QAM | Quadrature Amplitude Modulation |
| QCI | QoS class of identifier |
| QCL | Quasi co-location |
| QFI | QoS Flow ID, QoS Flow Identifier |
| QoS | Quality of Service |
| QPSK | Quadrature (Quaternary) Phase Shift Keying |
| QZSS | Quasi-Zenith Satellite System |
| RA-RNTI | Random Access RNTI |
| RAB | Radio Access Bearer, Random Access Burst |
| RACH | Random Access Channel |
| RADIUS | Remote Authentication Dial In User Service |
| RAN | Radio Access Network |
| RAND | RANDom number (used for authentication) |
| RAR | Random Access Response |
| RAT | Radio Access Technology |
| RAU | Routing Area Update |
| RB | Resource block, Radio Bearer |
| RBG | Resource block group |
| REG | Resource Element Group |
| Rel | Release |
| REQ | REQuest |
| RF | Radio Frequency |
| RI | Rank Indicator |
| RIV | Resource indicator value |
| RL | Radio Link |
| RLC | Radio Link Control, Radio Link Control layer |
| RLC AM | RLC Acknowledged Mode |
| RLC UM | RLC Unacknowledged Mode |
| RLF | Radio Link Failure |
| RLM | Radio Link Monitoring |
| RLM-RS | Reference Signal for RLM |
| RM | Registration Management |
| RMC | Reference Measurement Channel |
| RMSI | Remaining MSI, Remaining Minimum System Information |
| RN | Relay Node |
| RNC | Radio Network Controller |
| RNL | Radio Network Layer |
| RNTI | Radio Network Temporary Identifier |
| ROHC | RObust Header Compression |
| RRC | Radio Resource Control, Radio Resource Control layer |
| RRM | Radio Resource Management |
| RS | Reference Signal |
| RSRP | Reference Signal Received Power |
| RSRQ | Reference Signal Received Quality |
| RSSI | Received Signal Strength Indicator |
| RSU | Road Side Unit |
| RSTD | Reference Signal Time difference |
| RTP | Real Time Protocol |
| RTS | Ready-To-Send |
| RTT | Round Trip Time |
| Rx | Reception, Receiving, Receiver |
| S1AP | S1 Application Protocol |
| S1-MME | S1 for the control plane |
| S1-U | S1 for the user plane |
| S-GW | Serving Gateway |
| S-RNTI | SRNC Radio Network Temporary Identity |
| S-TMSI | SAE Temporary Mobile Station Identifier |
| SA | Standalone operation mode |
| SAE | System Architecture Evolution |
| SAP | Service Access Point |
| SAPD | Service Access Point Descriptor |
| SAPI | Service Access Point Identifier |
| SCC | Secondary Component Carrier, Secondary CC |
| SCell | Secondary Cell |
| SC-FDMA | Single Carrier Frequency Division Multiple Access |
| SCG | Secondary Cell Group |
| SCM | Security Context Management |
| SCS | Subcarrier Spacing |
| SCTP | Stream Control Transmission Protocol |
| SDAP | Service Data Adaptation Protocol, Service Data Adaptation Protocol layer |
| SDL | Supplementary Downlink |
| SDNF | Structured Data Storage Network Function |
| SDP | Session Description Protocol |
| SDSF | Structured Data Storage Function |
| SDU | Service Data Unit |
| SEAF | Security Anchor Function |
| SeNB | secondary eNB |
| SEPP | Security Edge Protection Proxy |
| SFI | Slot format indication |
| SFTD | Space-Frequency Time Diversity, SFN and frame timing difference |
| SFN | System Frame Number |
| SgNB | Secondary gNB |
| SGSN | Serving GPRS Support Node |
| S-GW | Serving Gateway |
| SI | System Information |
| SI-RNTI | System Information RNTI |
| SIB | System Information Block |
| SIM | Subscriber Identity Module |
| SIP | Session Initiated Protocol |
| SiP | System in Package |
| SL | Sidelink |
| SLA | Service Level Agreement |
| SM | Session Management |
| SMF | Session Management Function |
| SMS | Short Message Service |
| SMSF | SMS Function |
| SMTC | SSB-based Measurement Timing Configuration |
| SN | Secondary Node, Sequence Number |
| SoC | System on Chip |
| SON | Self-Organizing Network |
| SpCell | Special Cell |
| SP-CSI-RNTI | Semi-Persistent CSIR NTI |
| SPS | Semi-Persistent Scheduling |
| SQN | Sequence number |
| SR | Scheduling Request |
| SRB | Signalling Radio Bearer |
| SRS | Sounding Reference Signal |
| SS | Synchronization Signal |
| SSB | Synchronization Signal Block, SS/PBCH Block |
| SSBRI | SS/PBCH Block Resource Indicator, Synchronization Signal Block Resource Indicator |
| SSC | Session and Service Continuity |
| SS-RSRP | Synchronization Signal based Reference Signal Received Power |
| SS-RSRQ | Synchronization Signal based Reference Signal Received Quality |
| SS-SINR | Synchronization Signal based Signal to Noise and Interference Ratio |
| SSS | Secondary Synchronization Signal |
| SSSG | Search Space Set Group |
| SSSIF | Search Space Set Indicator |
| SST | Slice/Service Types |
| SU-MIMO | Single User MIMO |
| SUL | Supplementary Uplink |
| TA | Timing Advance, Tracking Area |
| TAC | Tracking Area Code |
| TAG | Timing Advance Group |
| TAU | Tracking Area Update |
| TB | Transport Block |
| TBS | Transport Block Size |
| TBD | To Be Defined |
| TCI | Transmission Configuration Indicator |
| TCP | Transmission Communication Protocol |
| TDD | Time Division Duplex |
| TDM | Time Division Multiplexing |
| TDMA | Time Division Multiple Access |
| TE | Terminal Equipment |
| TEID | Tunnel End Point Identifier |
| TFT | Traffic Flow Template |
| TMSI | Temporary Mobile Subscriber Identity |
| TNL | Transport Network Layer |
| TPC | Transmit Power Control |
| TPMI | Transmitted Precoding Matrix Indicator |
| TR | Technical Report |
| TRP, TRxP | Transmission Reception Point |
| TRS | Tracking Reference Signal |

| | -continued |
|---|---|
| TRx | Transceiver |
| TS | Technical Specifications, Technical Standard |
| TTI | Transmission Time Interval |
| Tx | Transmission, Transmitting, Transmitter |
| U-RNTI | UTRAN Radio Network Temporary Identity |
| UART | Universal Asynchronous Receiver and Transmitter |
| UCI | Uplink Control Information |
| UE | User Equipment |
| UDM | Unified Data Management |
| UDP | User Datagram Protocol |
| UDSF | Unstructured Data Storage Network Function |
| UICC | Universal Integrated Circuit Card |
| UL | Uplink |
| UM | Unacknowledged Mode |
| UML | Unified Modelling Language |
| UMTS | Universal Mobile Telecommunications System |
| UP | User Plane |
| UPF | User Plane Function |
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2I | Vehicle-to-Infrastructure |
| V2P | Vehicle-to-Pedestrian |
| V2V | Vehicle-to-Vehicle |
| V2X | Vehicle-to-everything |
| VIM | Virtualized Infrastructure Manager |
| VL | Virtual Link, |
| VLAN | Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |
| VNFM | VNF Manager |
| VoIP | Voice-over-IP, Voice-over- Internet Protocol |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | eXtensible Markup Language |
| XRES | EXpected user RESponse |
| XOR | eXclusive OR |
| ZC | Zadoff-Chu |
| ZP | Zero Power |

9. Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure.

What is claimed is:

1. One or more non-transitory computer-readable media (NTCRM) comprising instructions for operating a centralized load balancing optimization (C-LBO) function, wherein execution of the instructions by one or more processors is to cause a compute node to:
    collect load-related measurements for a set of new radio (NR) cells;
    determine, based on the load-related measurements, that load distribution optimization among the set of NR cells is necessary;
    consume a management service (MnS) of a network function (NF) provisioning MnS to configure a set of load balancing optimization (LBO) parameters for NFs at the set of NR cells, wherein the consumption of the MnS is to cause the NF provisioning MnS to change the LBO parameters in the NFs;
    collect LBO performance measurements to evaluate performance of the C-LBO function; and
    analyze the LBO performance measurements to determine whether the performance of the C-LBO function meets an expected LBO performance.

2. The one or more NTCRM of claim 1, wherein the load-related measurements include one or more of a total downlink (DL) physical resource block (PRB) usage, a total uplink (UL) PRB usage, a distribution of DL total PRB usage, a distribution of UL total PRB usage, amount of DL PRBs used for data traffic, amount of UL PRBs used for data traffic, a mean number of radio resource control (RRC) Connections, a maximum number of RRC Connections, a mean number of stored inactive RRC Connections, a maximum number of stored inactive RRC Connections, a number of attempted RRC connection establishments, a number of successful RRC connection establishments, a number of RRC connection re-establishment attempts, a number of successful RRC connection re-establishment, a number of RRC connection resuming attempts, and a number of successful RRC connection resumes.

3. The one or more NTCRM of claim 1, wherein execution of the instructions is to cause the compute node to:
enable the C-LBO function for a new radio (NR) cell if the C-LBO function for the NR cell is not enabled.

4. The one or more NTCRM of claim 3, wherein, when the performance of the C-LBO function does not meet the expected LBO performance, execution of the instructions is to cause the compute node to:
consume the MnS for the NF provisioning MnS to configure an updated set of LBO parameters, wherein the consumption of the MnS is to cause the NF provisioning MnS to update the NFs with the updated set of LBO parameters.

5. The one or more NTCRM of claim 1, wherein execution of the instructions is to cause the compute node to collect the load-related measurements from a performance assurance MnS producer.

6. The one or more NTCRM of claim 1, wherein execution of the instructions is to cause the compute node to collect the LBO performance measurements from a performance assurance MnS producer.

7. The one or more NTCRM of claim 6, wherein the LBO performance measurements include one or more of a mean number of RRC connections, a number of attempted RRC connection establishments, a number of successful RRC connection establishments, a number of RRC connection re-establishment attempts, a number of successful RRC connection re-establishment with user equipment (UE) context, a number of successful RRC connection re-establishment without UE context, a number of RRC connection resuming attempts, a number of successful RRC connection resuming, a number of released RRC connections, a number of abnormal releases, a number of handover failures, a number of call drops, a number of requested handover preparations, a number of failed handover preparations, a number of requested handover resource allocations, a number of failed handover resource allocations, a number of requested handover executions, a number of failed handover executions, a number of protocol data unit (PDU) Sessions requested to setup, or a number of PDU Sessions failed to setup.

8. One or more non-transitory computer-readable media (NTCRM) comprising instructions for operating a centralized load balancing optimization (C-LBO) function, wherein execution of the instructions by one or more processors is to cause a compute node to:
receive a request to enable a load balancing optimization (LBO) function from a management services (MnS) consumer of a centralized self-organizing network (C-SON) management;
enable the LBO function in response to receipt of the request;
collect load-related measurements for a plurality of new radio (NR) cells;
determine, based on the load-related measurements, that load distribution optimization among the plurality of NR cells is necessary;
consume MnS of a network function (NF) provisioning MnS to configure a set of LBO parameters for NFs at the plurality of NR cells, wherein the consumption of the MnS is to cause the NF provisioning MnS to change the LBO parameters in the NFs;
collect LBO performance measurements to evaluate performance of the C-LBO function; and
analyze the LBO performance measurements to determine whether the performance of the C-LBO function meets an expected LBO performance.

9. The one or more NTCRM of claim 8, wherein the load-related measurements include one or more of a total downlink (DL) physical resource block (PRB) usage, a total uplink (UL) PRB usage, a distribution of DL total PRB usage, a distribution of UL total PRB usage, amount of DL PRBs used for data traffic, amount of UL PRBs used for data traffic, a mean number of radio resource control (RRC) Connections, a maximum number of RRC Connections, a mean number of stored inactive RRC Connections, a maximum number of stored inactive RRC Connections, a number of attempted RRC connection establishments, a number of successful RRC connection establishments, a number of RRC connection re-establishment attempts, a number of successful RRC connection re-establishment, a number of RRC connection resuming attempts, and a number of successful RRC connection resumes.

10. The one or more NTCRM of claim 8, wherein the set of LBO parameters include a handover parameter or a cell reselection parameter.

11. The one or more NTCRM of claim 10, wherein execution of the instructions is to cause the compute node to:
consume the MnS for the NF provisioning MnS to configure an updated set of LBO parameters, wherein the consumption of the MnS is to cause the NF provisioning MnS to update the NFs with the updated set the LBO parameters.

12. The one or more NTCRM of claim 8, wherein execution of the instructions is to cause the compute node to collect the load-related measurements from a performance assurance MnS producer.

13. The one or more NTCRM of claim 8, wherein execution of the instructions is to cause the compute node to collect LBO performance measurements from a performance assurance MnS producer, wherein the LBO performance measurements include a number of established radio resource control (RRC) connections, a number of released RRC connections, a number of abnormal releases, a number of handover failures, or a number of call drops.

* * * * *

UNITED STATES PATENT AND TRADEMARK OFFICE
CERTIFICATE OF CORRECTION

PATENT NO. : 11,963,041 B2
APPLICATION NO. : 17/092126
DATED : April 16, 2024
INVENTOR(S) : Joey Chou et al.

Page 1 of 1

It is certified that error appears in the above-identified patent and that said Letters Patent is hereby corrected as shown below:

In the Claims

Column 63
Claim 3, Line 5, replace "a new radio (NR)" with "an NR"

Column 64
Claim 9, Line 28, replace "re-establishment" with "re-establishments"

Column 64
Claim 9, Line 29, replace "re-establishment" with "re-establishments"

Column 64
Claim 11, Line 40, insert the word --of-- after "updated set" and before "the"

Column 63
Claim 7, Line 30, replace "re-establishment" with "re-establishments"

Column 63
Claim 7, Lines 31-32, replace "re-establishment" with "re-establishments"

Column 64
Claim 10, Line 33, replace "include" with "includes"

Signed and Sealed this
First Day of October, 2024

Katherine Kelly Vidal
*Director of the United States Patent and Trademark Office*